US011120390B2

(12) United States Patent
Tartal et al.

(10) Patent No.: US 11,120,390 B2
(45) Date of Patent: Sep. 14, 2021

(54) SMART DROP BOX

(71) Applicant: United States Postal Service, Washington, DC (US)

(72) Inventors: William Albert Tartal, Baltimore, MD (US); Gabriel Michael Yessin, Vienna, VA (US); Dominique Danielle Strothers, Front Royal, VA (US); Joram Shenhar, Fairfax, VA (US); Joel Locknauth Dewnandan, Bladensburg, MD (US); Terry Martin Gingell, Spotsylvania, VA (US); James Edmund Matthews, Bowie, MD (US)

(73) Assignee: United States Postal Service, Washington, DC (US)

(*) Notice: Subject to any disclaimer, the term of this patent is extended or adjusted under 35 U.S.C. 154(b) by 305 days.

(21) Appl. No.: 15/672,785

(22) Filed: Aug. 9, 2017

(65) Prior Publication Data
US 2018/0046978 A1 Feb. 15, 2018

Related U.S. Application Data

(60) Provisional application No. 62/374,190, filed on Aug. 12, 2016.

(51) Int. Cl.
G06Q 10/08 (2012.01)
G07D 11/00 (2019.01)
(Continued)

(52) U.S. Cl.
CPC ..... G06Q 10/0832 (2013.01); G06Q 10/0833 (2013.01); G06Q 20/202 (2013.01);
(Continued)

(58) Field of Classification Search
CPC .......... A47G 29/12–30; G06Q 10/083; G06Q 50/28; G06Q 50/32
See application file for complete search history.

(56) References Cited

U.S. PATENT DOCUMENTS 5,385,265 A 1/1995 Schlamp
6,010,064 A 1/2000 Umeda et al.
(Continued)

FOREIGN PATENT DOCUMENTS

AU 2011224030 A1 10/2011
DE 10 2006 047 797 A1 4/2008
(Continued)

OTHER PUBLICATIONS

Paul Singh, S., Gary Burgess, and Jagjit Singh. "Measurement and analysis of the second-day air small and light-weight package shipping environment within federal express." Packaging Technology and Science: An International Journal 17.3 (2004): 119-127. (Year: 2004).*

(Continued)

Primary Examiner — Scott M Tungate
(74) Attorney, Agent, or Firm — Knobbe Martens Olson & Bear LLP

(57) ABSTRACT

A smart drop box, system, and method for providing item deposit verification. A smart drop box includes an item receptacle, a processor in communication with the item receptacle, and a user interface in communication with the processor. The item receptacle is configured to receive an item from a user, determine item information related to the item, and transfer the item to a collection container. The processor is configured to determine payment information based at least in part on the item information. The smart drop box is configured to provide deposit verification based at least in part on at least one of the item information and the payment information. In some embodiments, the deposit (Continued)

verification includes a printed receipt and/or an electronic notification.

20 Claims, 12 Drawing Sheets

(51) Int. Cl.
  G06Q 50/32 (2012.01)
  G07D 11/14 (2019.01)
  G06Q 20/20 (2012.01)
  G07C 9/00 (2020.01)

(52) U.S. Cl.
  CPC ......... *G06Q 20/203* (2013.01); *G06Q 20/204* (2013.01); *G06Q 20/209* (2013.01); *G06Q 50/32* (2013.01); *G07C 9/00896* (2013.01); *G07D 11/009* (2013.01); *G07D 11/14* (2019.01)

(56) References Cited

U.S. PATENT DOCUMENTS

| | | |
|---|---|---|
| 6,300,873 B1 | 10/2001 | Kucharczyk et al. |
| 6,845,909 B2 | 1/2005 | Bong et al. |
| 7,133,743 B2 | 11/2006 | Tilles et al. |
| 7,337,944 B2 | 3/2008 | Devar |
| 9,052,992 B2 | 6/2015 | Irwin et al. |
| 9,223,315 B2 | 12/2015 | Irwin et al. |
| 10,074,068 B2 | 9/2018 | Irwin et al. |
| 2002/0035515 A1 | 3/2002 | Moreno |
| 2002/0080030 A1 | 6/2002 | Inomata |
| 2002/0113703 A1 | 8/2002 | Moskowitz et al. |
| 2002/0147525 A1 | 10/2002 | Cayne et al. |
| 2002/0156645 A1* | 10/2002 | Hansen ............... G06Q 10/08 705/333 |
| 2003/0025590 A1 | 2/2003 | Gokcebay et al. |
| 2004/0089482 A1* | 5/2004 | Ramsden ......... G07B 17/00193 177/1 |
| 2004/0199284 A1 | 10/2004 | Hara |
| 2005/0040931 A1 | 2/2005 | Yasuhiro |
| 2005/0040932 A1 | 2/2005 | Cayne et al. |
| 2005/0067925 A1 | 3/2005 | Stone, III |
| 2005/0068178 A1 | 3/2005 | Lee et al. |
| 2005/0083176 A1 | 4/2005 | Yamada |
| 2005/0179349 A1 | 8/2005 | Booth et al. |
| 2006/0020366 A1 | 1/2006 | Bloom |
| 2006/0080133 A1* | 4/2006 | Das ....................... G06Q 10/08 705/39 |
| 2006/0138220 A1 | 6/2006 | Persky |
| 2008/0128444 A1 | 6/2008 | Schininger et al. |
| 2009/0015400 A1 | 1/2009 | Breed |
| 2009/0015405 A1 | 1/2009 | DiPoala |
| 2009/0076650 A1* | 3/2009 | Faes ...................... G07F 11/165 700/232 |
| 2009/0177739 A1 | 7/2009 | Uslontsev et al. |
| 2009/0187274 A1 | 7/2009 | Higham |
| 2011/0161249 A1 | 6/2011 | Whitehouse |
| 2012/0062362 A1 | 3/2012 | Ruddock et al. |
| 2012/0086314 A1 | 4/2012 | Bourke et al. |
| 2012/0089530 A1 | 4/2012 | Klingenberg et al. |
| 2012/0267057 A1* | 10/2012 | Rydberg ................ E05D 15/26 160/113 |
| 2012/0326840 A1 | 12/2012 | Frankenberg et al. |
| 2013/0144427 A1 | 6/2013 | Pugliese, III et al. |
| 2013/0144428 A1 | 6/2013 | Irwin et al. |
| 2013/0166060 A1 | 6/2013 | Irwin et al. |
| 2013/0166067 A1 | 6/2013 | Irwin et al. |
| 2013/0338822 A1 | 12/2013 | Gibson, Jr. et al. |
| 2013/0346509 A1 | 12/2013 | Elkins et al. |
| 2014/0203076 A1 | 7/2014 | Amdahl et al. |
| 2014/0330407 A1 | 11/2014 | Corder et al. |
| 2014/0330603 A1 | 11/2014 | Corder et al. |
| 2015/0145642 A1 | 5/2015 | Rutledge et al. |
| 2015/0254248 A1 | 9/2015 | Burns et al. |
| 2015/0310381 A1 | 10/2015 | Lyman |
| 2015/0371187 A1 | 12/2015 | Irwin et al. |
| 2016/0350712 A1 | 12/2016 | Wesemann et al. |
| 2017/0091710 A1 | 3/2017 | Van Dyke |
| 2017/0116571 A1* | 4/2017 | Tammattabattula ........................ G06Q 10/0835 |

FOREIGN PATENT DOCUMENTS

| | | |
|---|---|---|
| EP | 1 921 586 A1 | 5/2008 |
| EP | 2913804 A1 | 9/2015 |
| JP | 2002-189797 A | 7/2002 |
| WO | WO 01/31827 A2 | 5/2001 |
| WO | WO 02/07119 A1 | 1/2002 |
| WO | WO 02/074634 A2 | 9/2002 |
| WO | WO 2013/191787 A2 | 12/2013 |
| WO | WO 2015/173820 A1 | 11/2015 |
| WO | WO 2016/138582 A1 | 9/2016 |

OTHER PUBLICATIONS

International Search Report and Written Opinion dated May 22, 2017 in International Application No. PCT/US2017/023661.
International Search Report & Written Opinion dated Oct. 20, 2017 in International Application No. PCT/US2017/046093.
International Preliminary Report on Patentability dated Sep. 25, 2018 in International Application No. PCT/US2017/023661.
Sebastian, B. "Intelligent Mailbox System and Automatic Delivery Notification" <https://pdfs.semanticscholar.org/d8fd/ff82b1c6f2bee2ed9223b0a924c147ce6b80.pdf> Dec. 2015, Retrieved Sep. 23, 2019.
International Search Report & Written Opinion dated Aug. 9, 2018 in International Application No. PCT/US2018/030306 filed Apr. 30, 2018.
International Preliminary Report on Patentability dated Nov. 5, 2019 in International Application No. PCT/US2018/030306 filed Apr. 30, 2018.
Anonymous: "Mailbox Monitor | dgraves.org", Feb. 14, 2016, XP055682452, https://web.archive.org/web/20160214071632/http://dgraves.org/mailboxmonitor, retrieved Apr. 2, 2020.

* cited by examiner

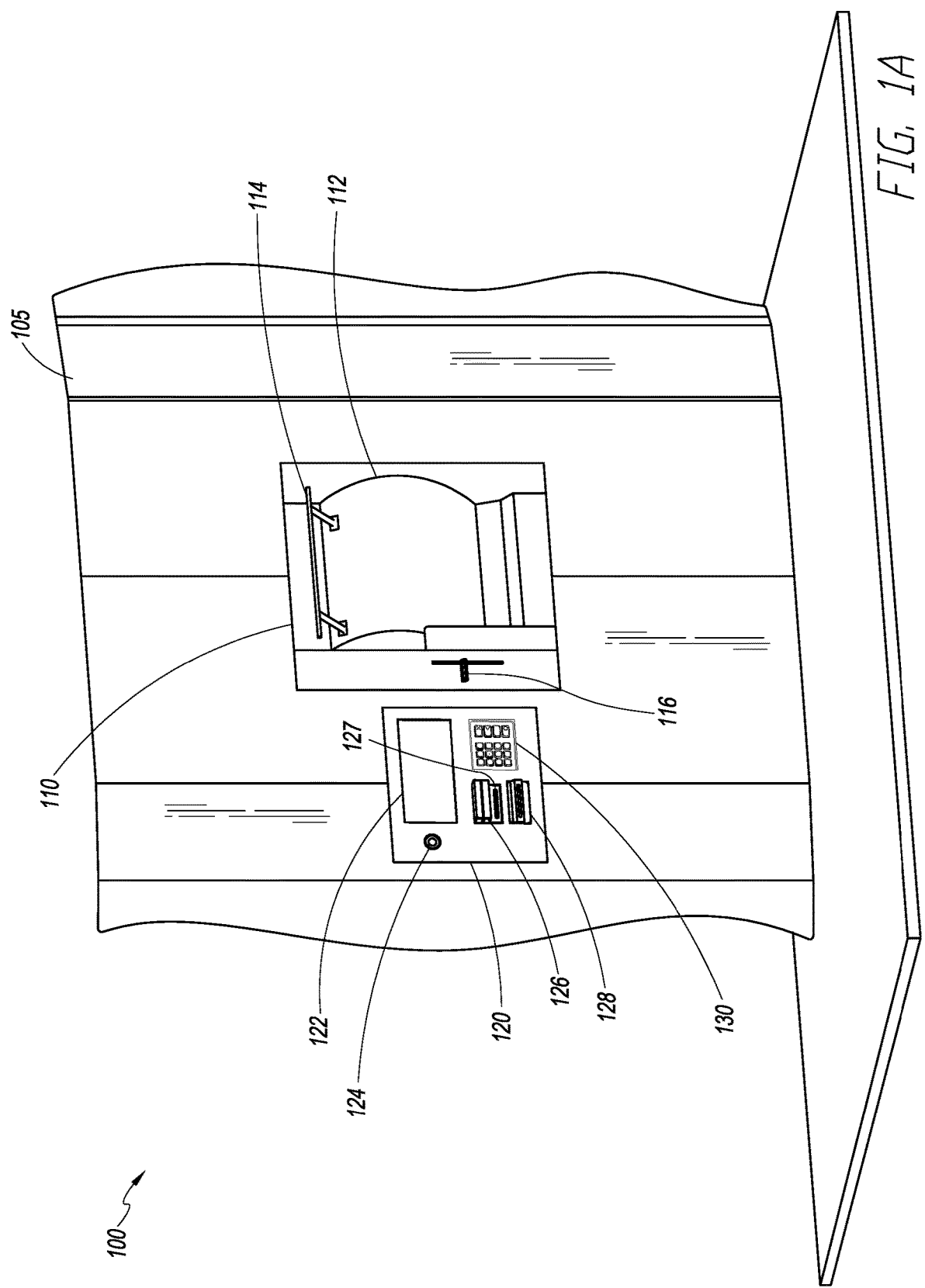

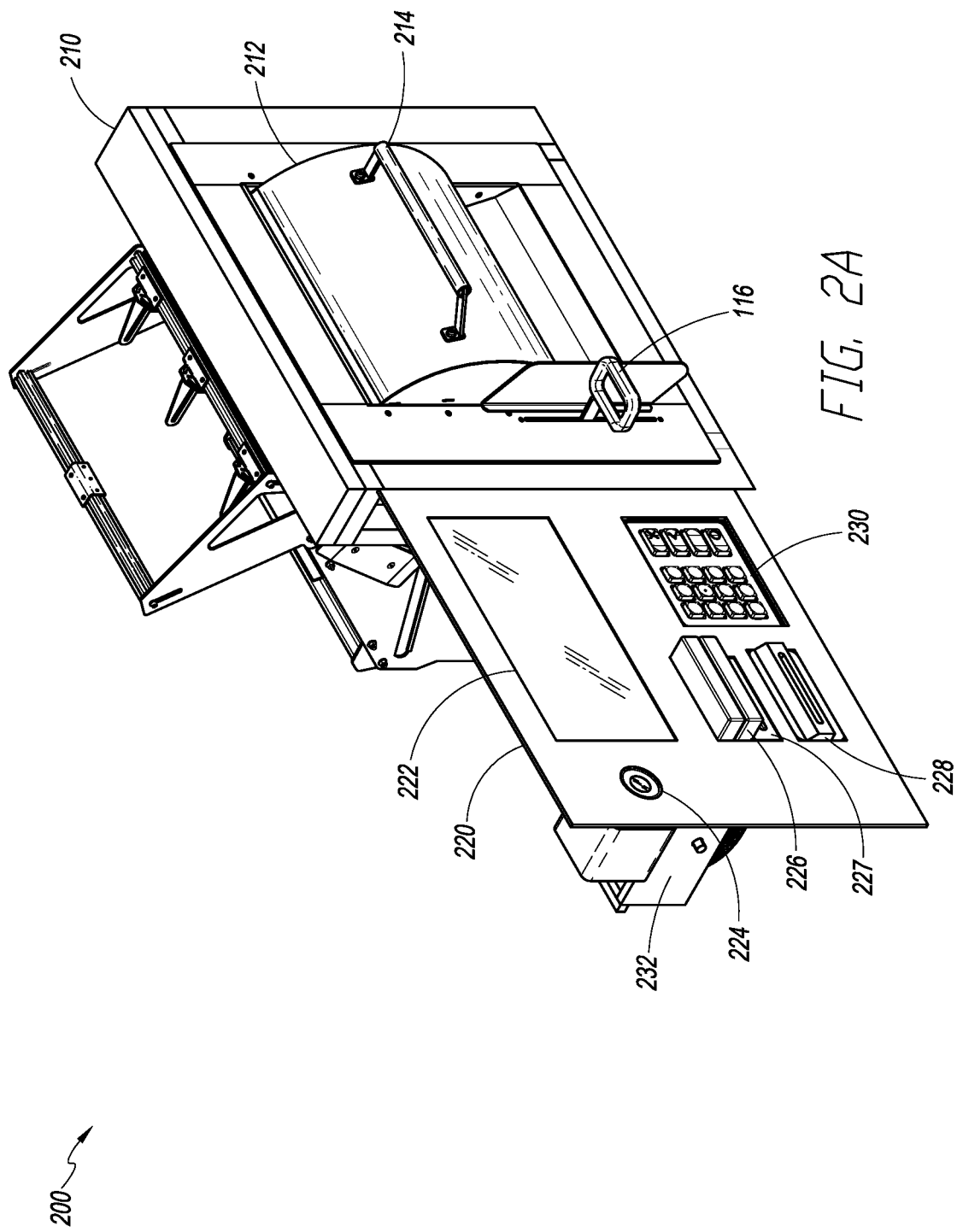

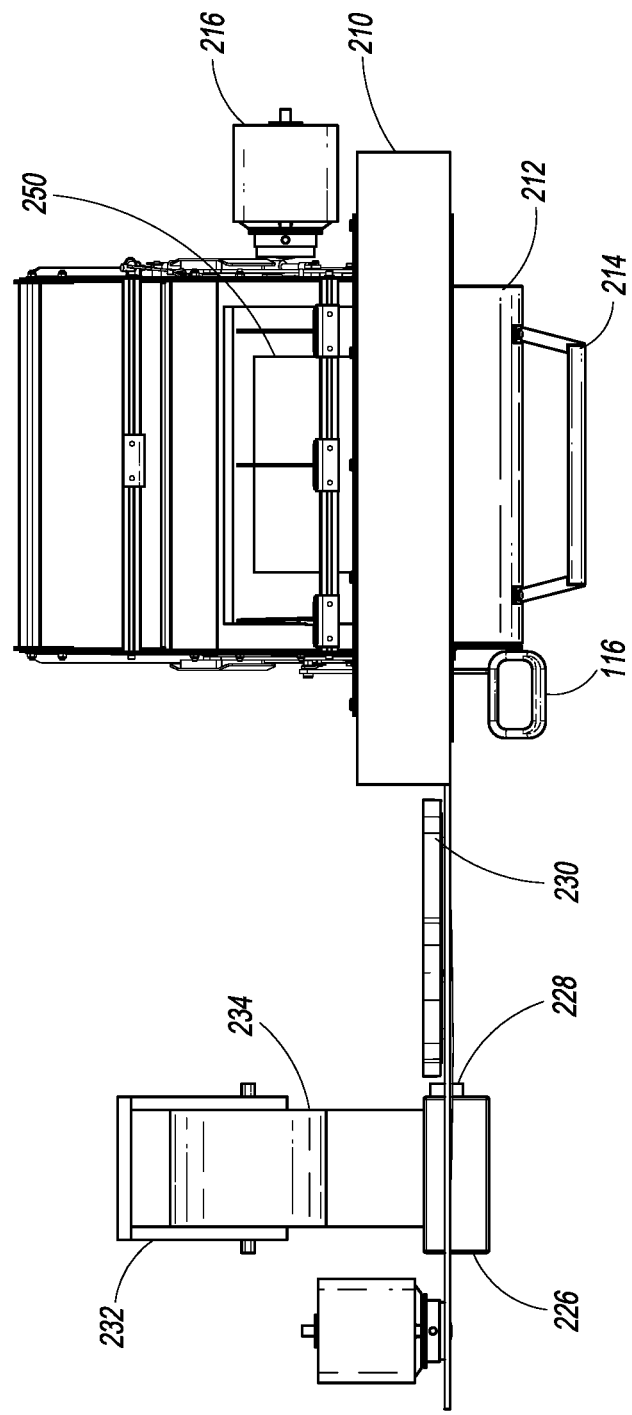

SMART DROP BOX

CROSS-REFERENCE TO RELATED APPLICATIONS

This application claims the benefit of U.S. Provisional Application Ser. No. 62/374,190, filed Aug. 12, 2016, entitled "SMART DROP BOX," which is hereby incorporated by reference in its entirety and for all purposes.

BACKGROUND

Field

This disclosure relates to systems and methods for secure transfer and verification of the deposit of items.

Description of the Related Art

Items, such as parcels, packages, envelopes, etc., may be deposited for shipping at a drop box. Some customers may desire a receipt or other acceptance verification to confirm deposit. Obtaining an acceptance verification receipt may require a customer to stand in line to drop off a parcel with an employee who can provide a receipt.

SUMMARY

In one aspect of the systems and methods disclosed herein, a smart drop box is described. The smart drop box includes an item receptacle, a processor in communication with the item receptacle, and a user interface in communication with the processor. The smart drop box is configured to receive an item from a user, determine item information related to the item, and transfer the item to a collection container. The processor is configured to determine payment or other information based at least in part on the item information. The user interface includes a display screen and an input device. The smart drop box is configured to provide deposit verification based at least in part on at least one of the item information and the payment information.

In some embodiments, the smart drop box is configured to provide the deposit verification responsive to an input received at the input device.

In some embodiments, the smart drop box further comprises an external imaging device configured to capture an image of the user, and the deposit verification comprises the image of the user.

In some embodiments, the deposit verification comprises transmitting the image to a person other than the user.

In some embodiments, the item receptacle comprises an internal imaging device configured to read a label, and determining item information comprises optically reading encoded information using the imaging device from a label affixed to the item.

In some embodiments, determining payment information comprises obtaining, from a sever, a record of payment associated with the encoded information.

In some embodiments, the item receptacle comprises a scale, and determining item information comprises measuring a weight of the item using the scale.

In some embodiments, the smart drop box further comprises a printer, and the deposit verification comprises printing a receipt using the printer.

In some embodiments, the deposit verification comprises sending an electronic receipt to an email address associated with the user.

In some embodiments, the deposit verification comprises sending an electronic receipt to an email address associated with a person other than the user.

In another aspect, a method of providing item deposit verification is described. The method includes receiving an item from a user at an item receptacle of an automated drop box, determining item information related to the item, determining payment information based at least in part on the item information, transferring the item to a collection container, and providing a deposit verification based at least in part on at least one of the item information and the payment information.

In some embodiments, the method further comprises capturing an image of the user, and the deposit verification comprises the image of the user.

In some embodiments, providing the deposit verification comprises transmitting the image of the user to a person other than the user.

In some embodiments, determining item information comprises optically reading encoded information from a label affixed to the item.

In some embodiments, determining payment information comprises obtaining, from a server, a record of payment associated with the encoded information.

In some embodiments, determining item information comprises measuring a weight of the item.

In some embodiments, providing a deposit verification comprises printing a receipt.

In some embodiments, providing a deposit verification comprises sending an electronic receipt to an email address associated with the user.

In some embodiments, providing a deposit verification comprises sending an electronic receipt to an email address associated with a person other than the user.

In another aspect, a smart drop box system is described. The smart drop box system includes means for receiving an item, means for determining item information related to the item, means for obtaining stored payment information based at least in part on the item information, and means for providing a deposit verification based at least in part on at least one of the item information and the payment information. The item information comprises at least one of a tracking number, a size of the item, and a weight of the item. The payment information comprises a record of payment associated with the item.

BRIEF DESCRIPTION OF THE DRAWINGS

The foregoing and other features of the disclosure will become more fully apparent from the following description and appended claims, taken in conjunction with the accompanying drawings.

FIG. 1A is a perspective view of an embodiment of a smart drop box system including a wall drum item receptacle.

FIG. 2A is a perspective view of an embodiment of a wall drum item receptacle and a user interface in a smart drop box.

FIG. 2B is a top view of an embodiment of a wall drum item receptacle and a user interface in the smart drop box of FIG. 2A.

DETAILED DESCRIPTION

Figure 1B:
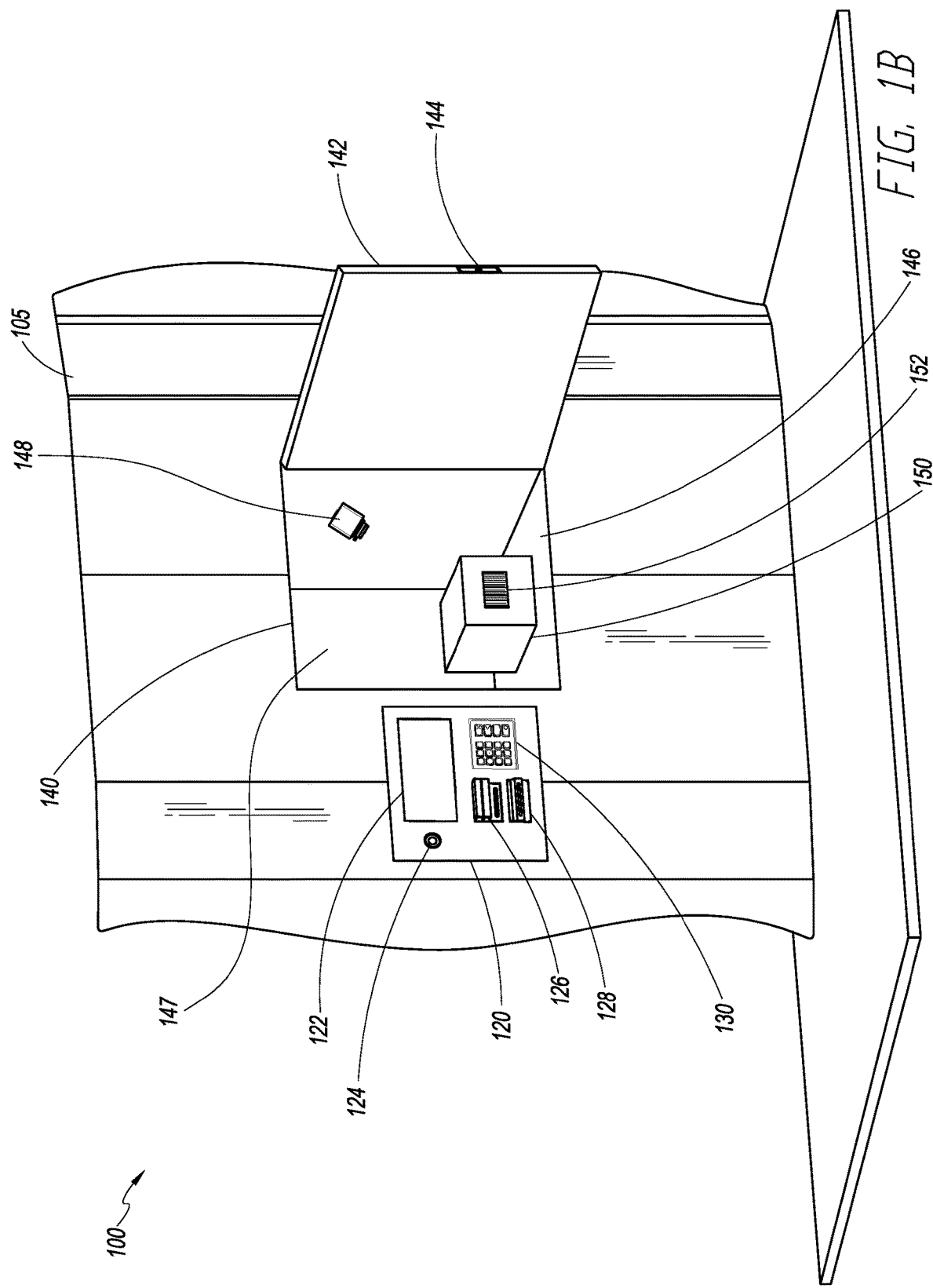
FIG. 1B is a perspective view of an embodiment of a smart drop box system including a locker-type item receptacle.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

When depositing an item in a receptacle, a depositor may desire to receive verification of the deposit. For example, a seller shipping a sold item to the buyer of the item might wish to receive a printed or electronic receipt confirming that the item was deposited with a distribution network for shipping. Similarly, the buyer or a transaction facilitator, such as a business-to-consumer or consumer-to-consumer e-commerce platform, might wish to receive an electronic confirmation that the item was shipped or inducted for shipping before releasing payment to the seller. Deposit verification may be desired for various reasons. For example, a consumer-to-consumer or drop shipping e-commerce platform that does not directly control the shipping process may wish to securely track shipped items to provide reliable tracking services and/or fairly settle disputes between buyers and sellers. In some cases, an e-commerce platform may withhold a payment or refund from a seller or buyer until the shipped or returned item is confirmed. Thus, deposit verification may allow an e-commerce platform to improve customer satisfaction by transferring funds as soon as an item is confirmed to be deposited, rather than waiting until the item is delivered.

In order to obtain a printed or electronic deposit confirmation, the depositor typically has to deposit the item with an employee, such as an employee of a storage facility or a distribution network, who accepts the item and generates a receipt and/or electronic confirmation. Depositing the item with an employee may require the depositor to spend time waiting in a line with other customers or traveling to an office of a distribution network. Such time expenditures may be burdensome if the depositor has a busy schedule or does not live near a shipping office. The smart drop box systems disclosed herein are configured to receive deposited items, determine payment information, and generate printed or electronic deposit verification.

FIG. 1A depicts an embodiment of a smart drop box 100 installed along a wall 105. The smart drop box 100 includes a wall drum item receptacle 110 (shown in a closed position), including a rotatable drum 112 and a handle 114. The smart drop box 100 further includes a user interface 120. The user interface 120 includes a screen 122, an external image capture device 124, a magnetic card reader 126, a currency acceptor 127, a printer output 128, and a keypad 130. The item receptacle 110 and the user interface 120, as well as their subcomponents, may be connected to and in communication with computer elements (not shown) of the smart drop box 100, such as one or more processors and/or memory circuits, which will be described in greater detail with reference to FIG. 3.

The wall drum item receptacle 110 can be configured to receive an item within the drum 112 when the drum 112 is rotated to an open position, and can further be configured to automatically drop the item into a box, bin, or other collection container (not shown) behind the wall 105 when the drum 112 is returned to a closed position. For example, the wall drum 112 can be a cylinder mounted so as to rotate about a longitudinal axis passing through the two circular end faces of the cylinder. The drum 112 can include a cavity in the side of the cylinder, configured to receive an item. In one example, the cavity can include a radial wedge-shaped portion of the cylinder. The cavity can be positioned such that the cavity is exposed to the outside when the drum 112 is in an open position. The cavity can further be configured to allow an item within the cavity to fall out of the drum 112 and into a collection container due to gravity, when the drum 112 is in a closed position. The drum 112 can be rotated from the closed position shown to an open position by moving the handle 114 downward. An intermediate position can be a rotational position between the open position and the closed position. For example, an intermediate position may be relatively close to the closed position so as to prevent a user from taking an item out of the drum 112, while also being far enough from the closed position such that gravity does not cause the item within the drum 112 to fall into the collection container.

The wall drum item receptacle 110 may be configured to be operable manually, such as by a user of the smart drop box 100 rotating the drum 112 by the handle 114. In some embodiments, the receptacle 110 may be configured to be operated automatically by one or more motors (not shown) controlled by computer elements of the smart drop box 100. The receptacle 110 can include a secondary handle 116 mechanically linked to the drum 112 such that the drum 112 rotates when the secondary handle 116 is raised or lowered. The secondary handle 116 may be located at a lower height than the handle 114 and/or may provide mechanical advantage to reduce the force required to rotate the drum 112, so as to enhance accessibility for disabled users. The receptacle 110 may further include one or more locks (not shown)

controlled by computer elements of the smart drop box 100 and configured to prevent the drum 112 from rotating. The one or more locks may be configured to lock the drum 112 in an open position, a closed position, and/or an intermediate position between open and closed. For example, an intermediate position may be sufficiently closed to prevent an item in the drum 112 from being removed (e.g., "trapping" the item), while being far enough from a fully closed position that the item in the drum does not drop from the drum 112 into the collection container. As will be described in greater detail with reference to FIGS. 4 and 5, an intermediate position may advantageously allow the smart drop box 100 to secure an item for verification of postage, size, and/or weight, while also allowing the receptacle 110 to return the item to a user if acceptance of the item is rejected by the smart drop box 100 or by the user.

The user interface 120 can be configured for various purposes related to shipping or transit of items, such as receiving user input, providing user notifications, reading labels, accepting payment, facilitating the purchase of shipping or other transit services, or other user interactive functions. For example, the screen 122 may be configured to provide item drop-off instructions to a user, prompt a user to indicate if printed or electronic deposit verification is desired, and/or to direct payment functions. In some embodiments, the screen 122 may be only a display screen, or may be an interactive screen such as a touch screen configured to display graphic or text content and to receive tactile input from a user. The keypad 130 can be provided as an alternative or additional input source if the screen 122 is a touch screen, or can be the primary input device if the screen 122 is not capable of receiving input. In some embodiments, an audio notification feature may be provided. For example, a headphone jack or speaker (not shown) may be included in the user interface 120 to provide displayed information in an audible format, such as to enhance accessibility for visually impaired users.

The external image capture device 124 can be a camera (e.g., a still image camera, a video camera, a webcam, etc.), an optical scanner, a laser barcode scanner, or any other optical signal acquisition device or combination thereof. The external image capture device 124 may be configured to read payment or other information, such as a barcode or QR code on a label, printout, smartphone or tablet screen, and/or may be configured to take images for proof of deposit, such as an image of an item being deposited and of the person depositing the item.

The magnetic card reader 126 and the currency acceptor 127 may be configured to accept payment. For example, users intending to ship an item who have not prepaid for shipping services may make the necessary payment (e.g., paying for postage) at the smart drop box 100, and may provide payment by swiping or inserting a credit or debit card at the magnetic card reader 126, or by inserting cash at the currency acceptor 127. In some embodiments, the magnetic card reader 126 may further be configured to read magnetic media for purposes other than payment. For example, the magnetic card reader 126 may be configured to read a magnetic strip on a driver's license or other identification card to verify the identity of a user. In some embodiments, the user interface 120 comprises equipment configured for near field communication (NFC), Bluetooth, or similar wireless communication protocol for receiving electronic payment. The printer output 128 can provide printed documents to a user, such as an acceptance verification receipt, a receipt for purchase of shipping services, or other printed media. In an example implementation, the user interface 120 can wirelessly receive proof of payment from a user's mobile device, such as by scanning a QR code on the mobile device display, and print a corresponding shipping label at the printer output 128. In some embodiments, the user interface 120 may include more than one printer output 128. For example, a first printer output 128 may be configured to print adhesive labels, such as postage or shipping labels, while additional printer outputs (not shown) may be configured to print receipts or other non-adhesive confirmation documents, as well as other items such as postage stamps, or the like. Separate printer outputs 128 may generally be included, for example, if the smart drop box 100 is to provide printed items on different types of printing media (e.g., large adhesive labels, small adhesive labels, receipt paper, or the like).

In some embodiments, the receptacle 110 may not include a lock, and may be configured to perform all acceptance and verification functions described herein without securing the item in a locked position. In some non-locking embodiments, the smart drop box 100 may be configured to receive some items without performing any verification steps if verification is not requested by a user. For example, the receptacle 110 may be always unlocked and usable for depositing of items without verification. When an interaction with the user interface 120 indicates that verification is desired, one or more verification steps can be completed thereafter to verify the deposit of the next item placed into the receptacle 110. For example, upon indication at the user interface 120 that verification is desired, the user may be requested to scan a shipping label at the external image capture device 124. When the receptacle 110 is opened, one or more internal sensors may verify the insertion of an item, a shipping label on the item, a size or weight of the item, and/or the passage of the item into a container after the receptacle 110 is closed again. Internal sensors for deposit verification are discussed in greater detail below.

FIG. 1B is a perspective view of an additional embodiment of a smart drop box 100 having a locker-type item receptacle 140. Similar to the embodiment depicted in FIG. 1A, the smart drop box 100 depicted in FIG. 1B includes a user interface 120 including a screen 122, an external image capture device 124, a magnetic card reader 126, a currency acceptor 127, a printer output 128, and a keypad 130. The components of the user interface 120 can be the same as, and configured for any of the purposes described with reference to, the user interface components of FIG. 1A. The embodiment depicted in FIG. 1B has a locker-type item receptacle 140, including a door 142 with a locking mechanism 144 and a lower surface 146. The locker-type item receptacle 140 is configured to receive an item 150. A shipping label 152 can be affixed to the item 150. In some embodiments, a smart drop box 100 can include both a drum 112 and a locker-type item receptacle 140.

Similar to the wall drum item receptacle 110 depicted in FIG. 1A, the locker-type item receptacle 140 may be configured to secure an item 150 while payment information, size, and/or weight are verified. In an exemplary implementation, a user opens the door 142 of the receptacle 140 and places an item 150 on the lower surface 146 of the receptacle 140. The user then closes the door 142 and the smart drop box 100 locks the door 142 at the locking mechanism 144. In some embodiments, the door 142 may be at least partially transparent to allow a user to maintain visual contact with the item 150. While the door 142 is locked, a camera 148 of the smart drop box 100 can capture one or more images, such as to read payment information encoded in a barcode or QR code on the shipping label 152 or to determine a length, width, height, or volume of the item 150. In some aspects, a location and/or one or more dimensions of the item 150 can be determined, such as by the camera 148 and/or by other sensors such as a proximity sensor, light sensor, ultrasonic sensor, or the like. The camera 148 can determine an appropriate depth of field and/or focus for capturing images based on the determined location and/or dimensions of the item 150. In some embodiments, the camera 148 takes a series of images of the item at various depths of field or focus points to generate a useable image, that is, an image that can be clearly read by a computer system. A scale (not shown) can determine the weight of the item 150. If the item 150 is rejected by the smart drop box 100 or the deposit is rejected by the user, the door 142 can be unlocked so that the user may retrieve the item 150. If the item 150 is accepted, the locker-type item receptacle 140 can transfer the item 150 to a box, bin, or other collection container behind the wall 105. In some embodiments, at least a portion of the lower surface 146 of the locker-type item receptacle 140can be tilted to cause the item 150 to fall into the collection container. In some embodiments, a rear surface 165 of the locker-type item receptacle 140 can be opened like a door from the other side of the wall 105, and the item 150 can be removed through the rear of the locker-type item receptacle 140. The item 150 may also be swept into the collection container by a rigid arm or other movable structure (not shown).

Figure 1C:
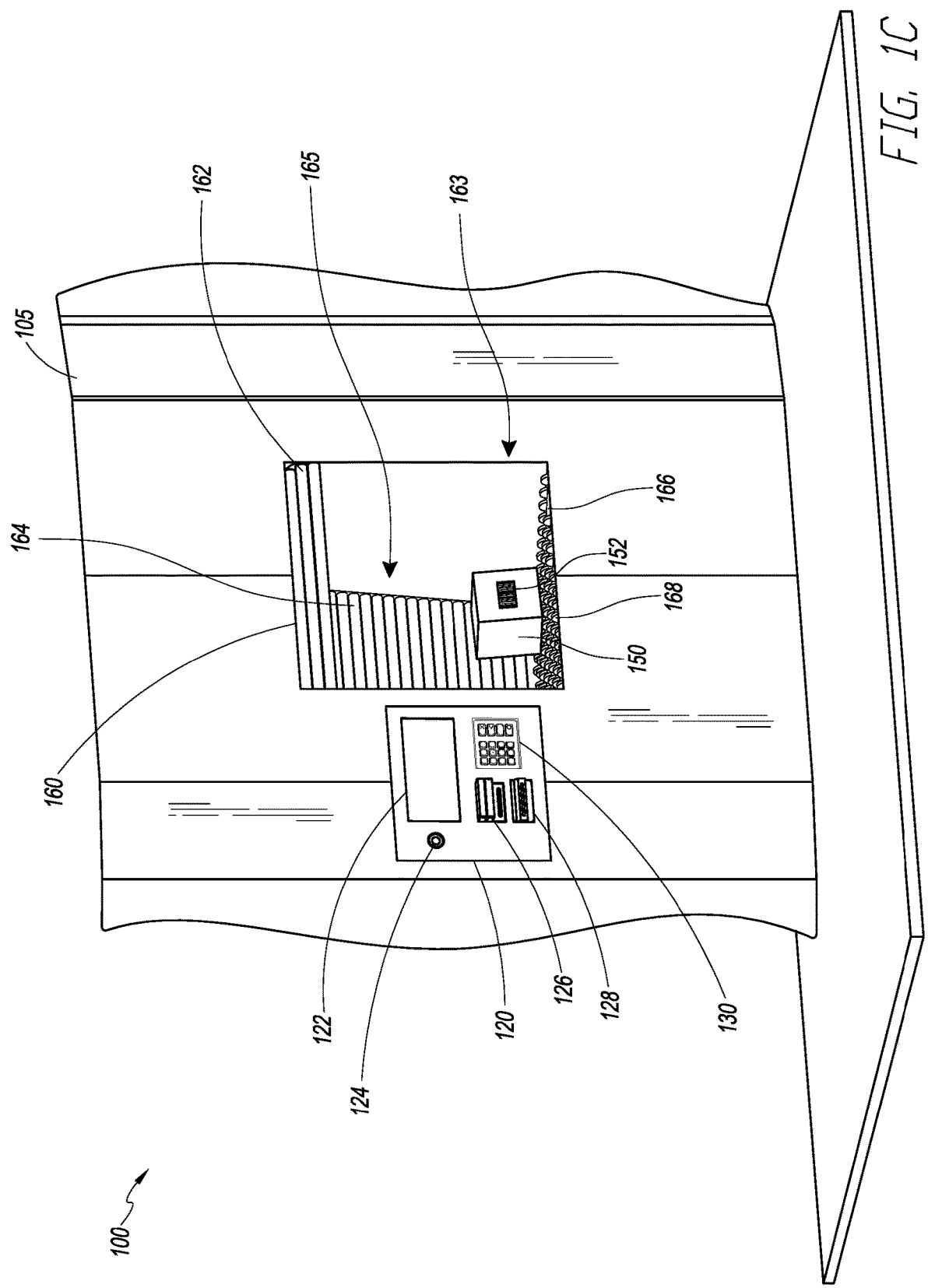
FIG. 1C is a perspective view of an embodiment of a smart drop box system including a shutter door item receptacle.

FIG. 1C is a perspective view of an embodiment of a smart drop box 100 including a shutter door item receptacle 160. Similar to the embodiments depicted in FIGS. 1A and 1B, the smart drop box 100 depicted in FIG. 1C includes a user interface 120 including a screen 122, an external image capture device 124, a magnetic card reader 126, a currency acceptor 127, a printer output 128, and a keypad 130. The components of the user interface 120 can be the same as, and configured for any of the purposes described with reference to, the user interface components of FIGS. 1A and 1B. The embodiment depicted in FIG. 1C has a shutter door item receptacle 160, including a front shutter door 162, a rear shutter door 164, and a lower surface 166 with rollers 168. The shutter door item receptacle 160 is configured to receive an item 150. A shipping label 152 can be affixed to the item 150.

The lower surface 166 of the shutter door item receptacle 160 can be sloped to facilitate the acceptance and securing of items such as the item 150. The lower surface 166 is disposed within the shutter door item receptacle 160 so as to be at a slope extending downward from an opening 163 of the shutter door item receptacle 160 to a rear portion 165 of the shutter door item receptacle 160. Thus, when the item 150 is placed onto the lower surface 166, the downward slope of the lower surface 166 causes the item 150 to roll along the rollers 168 to rest against the closed rear shutter door 164. The rear shutter door 164 can subsequently be opened, allowing the item 150 to continue sliding out of the rear portion 165 of the item receptacle 160, for example, into an item container or other structure (not shown) behind the item receptacle 160.

Figure 2C:
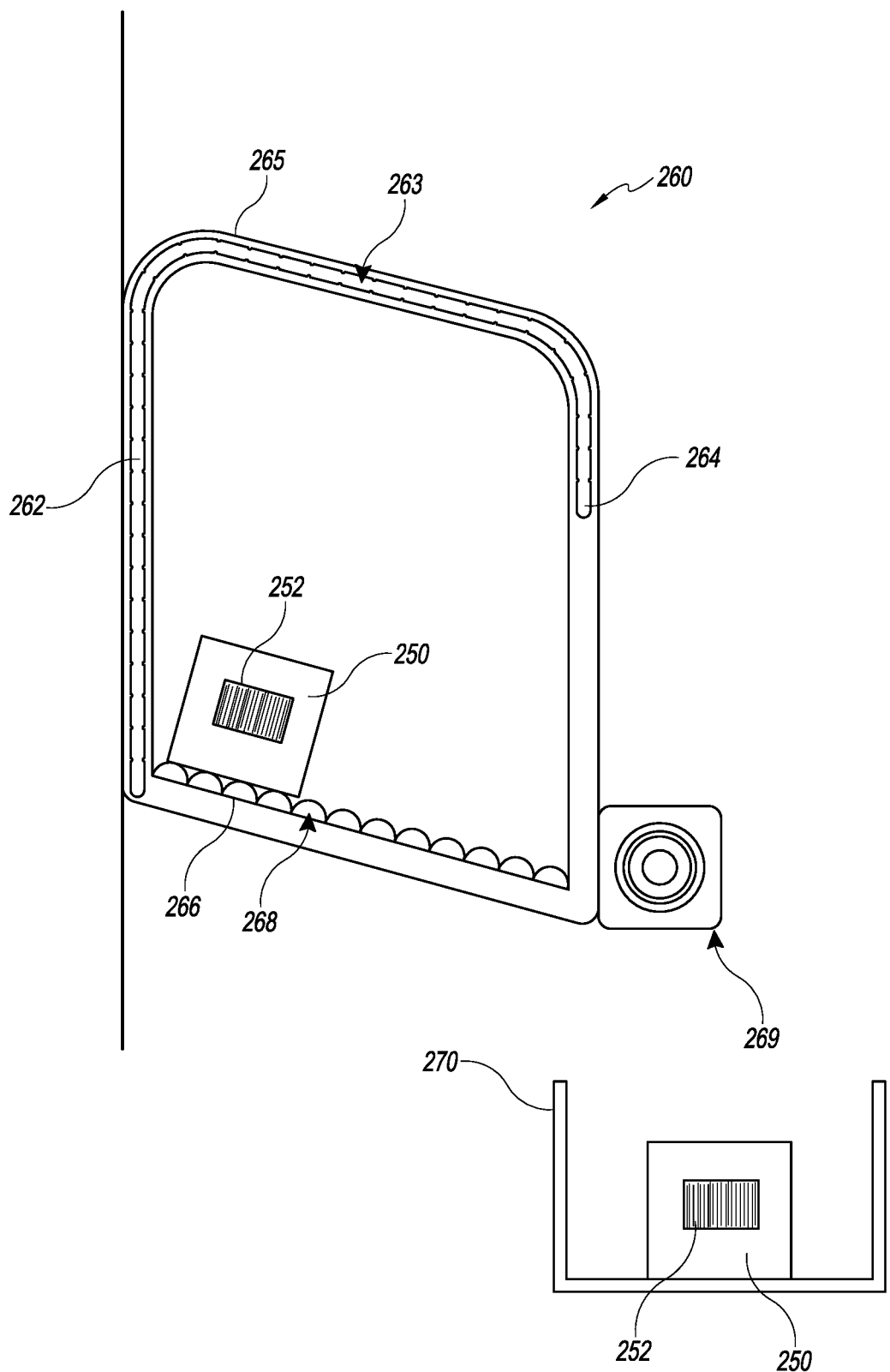
FIG. 2C is a side view of an embodiment of a shutter door item receptacle in a smart drop box.

In some embodiments, an interlock configuration may enhance the security of the smart drop box 100. In some embodiments, the front shutter door 162 can be closed before or at the same time the rear shutter door 164 opens (e.g., in an interlock configuration) such that only one of the front shutter door 162 and the rear shutter door is open. For example, the front shutter door 162 and the rear shutter door 164 may comprise a single flexible shutter, as shown in FIG. 2C, such that closing one of the shutter doors 162, 164 causes the other to be opened. In an example interlock configuration, the front shutter door 162 may only be openable while the rear shutter door 164 is closed, and the rear shutter door 164 may only be openable while the front shutter door 162 is closed. Thus, an item 150 can be secured within the smart drop box 100 and inaccessible to a user, preventing the user from depositing an item 150 and removing the item again after it is scanned and/or imaged. In addition, this example interlock configuration can prevent an item 150 from being pushed through both doors of the receptacle 160 without being scanned and/or imaged.

Although the embodiments of FIGS. 1A-1C are depicted and described as being located along and/or within a wall, each of the embodiments described herein may equally be implemented independent of a wall. For example, a smart drop box 100 having a drum, locker, or roller door type receptacle can be implemented in a stand-alone kiosk or other structure located in a central portion of a room, away from a wall, outdoors, or elsewhere. In stand-alone embodiments of the smart drop box 100, a kiosk or other structure attached to the smart drop box 100 may securely enclose a space in which received items can be stored after deposit until they are retrieved by the distribution network. A stand-alone smart drop box 100 may further include wired and/or wireless communication systems to communicate with a central management system for transmission and receipt of transaction data. For example, the smart drop box 100 may include Wi-Fi, cellular, LTE, or other wireless communication functionality for communication with nearby or distant devices. Remote communication functionality may further allow the system to provide a notification or status of the smart drop box 100, for example, a capacity notification if the kiosk needs to be emptied, notifications regarding errors, printer notifications indicating that additional printing media needs to be provided, or the like. Stand-alone embodiments of the smart drop box 100 may be implemented where installation of an in-wall drop box would be impractical. For example, a drop box location may not have sufficient wall space for installation of a smart drop box 100 within the wall, or other components or machinery may need to be relocated to provide sufficient wall space for installation of a smart drop box 100. In some situations, cutting a hole in a wall of an older building for installation of a smart drop box 100 may be impractical due to requiring asbestos or lead paint remediation, or the like.

FIG. 2A is a perspective view of an embodiment of a wall drum item receptacle 210 and a user interface 220 in a smart drop box 200 (depicted independent of a wall). FIG. 2B is a top view of the wall drum parcel receptacle 210 and the user interface 220 in the smart drop box 200. The wall drum item receptacle 210 includes a rotatable drum 212 and a handle 214 similar to those described elsewhere herein. The item receptacle 210 further includes an internal image capture device 216 configured to capture one or more images of an item 250 located within the rotatable drum 212. The internal image capture device 216 may be located anywhere in the vicinity of the drum 212 where it is capable of imaging the item 250, such as at a side of the drum 212, above the drum 212, or elsewhere.

The external components of the user interface 220 include a screen 222, an external image capture device 224, a magnetic card reader 226, a currency acceptor 227, a printer output 228, and a keypad 230, and are similar to those described elsewhere herein. The external image capture device 224 includes one or more processors, memory circuits, and/or communications circuits. The printer output 228 is coupled to a printer 232, such as a thermal receipt printer, configured to print receipts or other documents on paper 234.

FIG. 2C is a side view of a shutter door item receptacle 260 similar to the item receptacle 160 shown in FIG. 1C. The shutter door item receptacle 260 includes a flexible shutter 263, including a front section 262 and a rear section 264. The flexible shutter 263 is guided and supported by a track 265. The shutter door item receptacle 260 further includes a lower surface 266, rollers 268, and an internal sensor 269.

The flexible shutter 263 can slide along the track 265 between an open position and a closed position. In the closed position, shown in FIG. 2C, the flexible shutter 263 is positioned so that the front section 262 blocks substantially all of the front side of the item receptacle 260, preventing any items from being placed into the item receptacle 260. To open the item receptacle 260, the flexible shutter 263 is moved to the open position by sliding along the track 265 such that the front section 262 travels upward and the rear section 264 travels downward. Thus, in the open position, an item 250 may be received within the item receptacle 260 and rest against the rear section 264. When the flexible shutter 263 is returned to the closed position illustrated, the space between the rear section 264 of the flexible shutter 263 and the lower surface 266 allows an item within the receptacle to roll through the rear of the item receptacle 260 and fall into a bin 270 or other container positioned to receive deposited items 250.

As an item passes out of the item receptacle 260, it passes by the internal sensor 269. In various embodiments, the internal sensor 269 can be an image capture device, such as a camera or other recording device, a proximity sensing device, a light gate or other photoelectric sensor, an RF detector, and the like, or any combination thereof. The internal sensor 269 can be configured to detect that an item has passed through the item receptacle 260, and, thus, has been received in a container, and has been inducted into the distribution network. In some embodiments, the internal sensor 269 can be mounted on one or more movable components of the drum-type item receptacle 260. Accordingly, the internal sensor 269 can be connected to stationary components of the smart drop box 200 for power and/or data transmission by a wired or wireless connection. If the connection is wired, the connection may include one or more movable circuit elements such as flexible wiring, a flexible circuit, a slip ring connector, or other electrical connector configured to main an electrical connection through relative motion between components.

In some embodiments, the internal sensor 269 uses a broken signal in a light gate or photoelectric sensor, which would occur as the item passes from the item receptacle. In some embodiments, the label on the item includes an RFID or similar tag, which can be detected by the internal sensor 269 using an RF interrogator/detector. The RFID tag can encode the tracking number on the label, and the internal sensor 269 can read the tracking number and communicate the tracking number to processor, as will be described in greater detail below. In some embodiments, the RFID or similar tag can encode an identifier that can be used by a processor to determine that postage for the item has been paid.

In an exemplary implementation, a user scans an identifying label, such as a shipping label 252, on an item at an external image capture device 124 as shown in FIG. 1C. The flexible shutter 263 can be moved to the open position to accept the item, and then moved to the closed position to secure the item. If the internal sensor 269 subsequently detects the passage of an item, the smart drop box system can determine that an item associated with the scanned shipping label was deposited. If the same label 252 is detected later in downstream item processing, such as at a subsequent scan event, the smart drop box system or an associated computer system can determine that the item received was the item scanned, rather than a different item. This process will be described in greater detail below.

Figure 3:
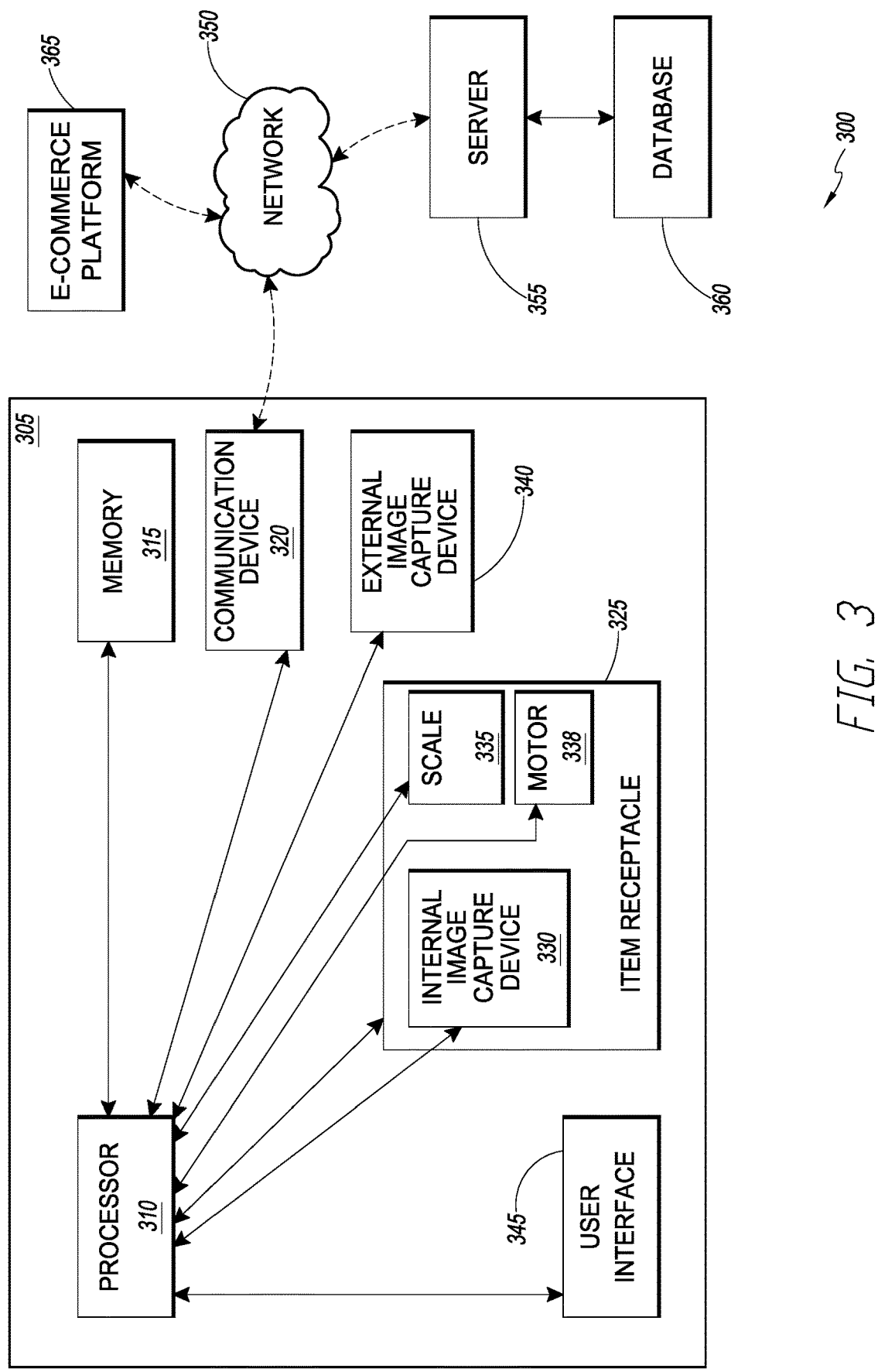
FIG. 3 is a block diagram of a smart drop box system.

FIG. 3 depicts a block diagram of a smart drop box system 300 in accordance with an exemplary embodiment. The system 300 includes a smart drop box 305 configured to connect to a server 355 and/or a database 360 through a network 350. The network 350 is further configured to connect to other systems, such as an e-commerce platform 365. The smart drop box 305 includes a processor 310 in communication with a memory 315, a communication device 320, an external image capture device 340, an item receptacle 325, and a user interface 345. The item receptacle 325 includes an internal image capture device 330, a scale 335, and a motor 338. In some embodiments, more than one motor 338 and/or another electromechanical device, such as a solenoid or the like, may be included. The item receptacle 325 may be any device or receptacle configured to receive an item, such as a wall drum or a locker as described above with reference to FIGS. 1A-2B. The internal image capture device 330 and scale 335 can image and weigh items within the receptacle 325 as described above. The motor 338 can move a movable portion of the receptacle 325 to, and/or cause the movable portion to remain locked in, an open, closed, or intermediate position. The item receptacle 325, the internal image capture device 330, the scale 335, and the motor 338 can be in electrical communication with the processor 310, together or individually.

The processor 310 is configured to control and receive input from the memory 315, the communication device 320, the parcel receptacle 325, the internal image capture device 330, the scale 335, the motor 338, the external image capture device 340, and the user interface 345. The memory 315 can store data received from the processor 310 and send data stored therein to the processor 310. The communication device 320 can facilitate the transfer of information between the processor 310 and the network 350, such as by transmitting and/or receiving data from the processor 310 and the network 350.

The processor can similarly control all functions of the item receptacle 325, the internal image capture device 330, the scale 335, the external image capture device 340, and the user interface 345 as described above with reference to FIGS. 1A-2B. For example, the user interface 345 can display a message on a display screen based on input received from the processor 310, and can transmit data to the processor, including input received from a user. The item receptacle 325 can lock or unlock, receive one or more items, and transmit a status of the item receptacle 325 to the processor 310. The scale 335 can measure the weight of an item within the item receptacle 325 and can transmit a measured weight to the processor 310. The external image capture device 340 can take a picture of a user, a printed or electronic document containing payment information, or any other object within visual range of the external image capture device 340. The internal image capture device 330 can take a picture of an item within the item receptacle 325 or read a label affixed to an item within the item receptacle 325. The processor 310 can receive data including images taken by the internal image capture device 330 and the external image capture device 340, weight information from the scale 335, and/or user input received at the user interface 345. The smart drop box 305 and all subcomponents may be similar to the smart drop boxes 100, 200 and their subcomponents as described above with reference to FIGS. 1A-2B.

In some embodiments, the picture of the item taken within the item receptacle 325 can be sent to the processor 310, which can then store the picture of the item. The picture of the item can be used as an identifier for tracking throughout the distribution network. In some embodiments, the picture of the item can be used as postage. The sender of an item may wish to pay postage for an item being deposited at the receptacle 100. When the label is scanned at the item receptacle 325, the item receptacle 325 interface device can ask if the user would like to pay postage for the item. The user can swipe a credit card, insert cash, use a near field communication payment system, input account information, and the like, to pay for postage. The information regarding the payment of postage can be attached to the picture of the item taken within the item receptacle 325. This payment information can then be used as evidence of postage throughout the distribution network.

The server 355 is configured to communicate with the communication device 320 through the network 350. The network can be any communication network configured to transmit data, such as the internet, a local area network (LAN), wireless communication such as Wi-Fi, satellite communication, or any other network capable of transferring data between the smart drop box 305 and the server 355. The server 355 is configured to communicate with the database 360, such as to retrieve payment information based on item information received from the communication device 320. In various embodiments, the server 355 and the database 360 can be located within the smart drop box 305, separate from but directly electrically connected to the smart drop box 305, or in a location remote from the smart drop box 305, such as a data facility configured to provide payment verification for a plurality of smart drop boxes 305. In some embodiments, the database 360 and/or server 355 can include cloud computing and/or cloud storage functions.

The e-commerce platform 365 can communicate with the server 355 and/or the smart drop box 305 via the network 350. For example, the e-commerce platform 365 may provide item information, such as expected item size and/or item weight for an item that has been sold through the e-commerce platform 365 and will be deposited for shipping from a seller to a buyer at smart drop box 305. In some embodiments, deposit verification as described elsewhere herein may include sending an electronic notification to the e-commerce platform 365, which can condition the transfer of payment from the buyer to the seller on a verified deposit of the item for shipping to the buyer. Item information and/or payment information may also be obtained by the smart drop box 305 and/or the server 355 from the e-commerce platform 365, for example, where the e-commerce platform 365 is configured to sell shipping services and/or print shipping labels for sellers or for entities that deposit items into the receptacles described herein.

Figure 4:
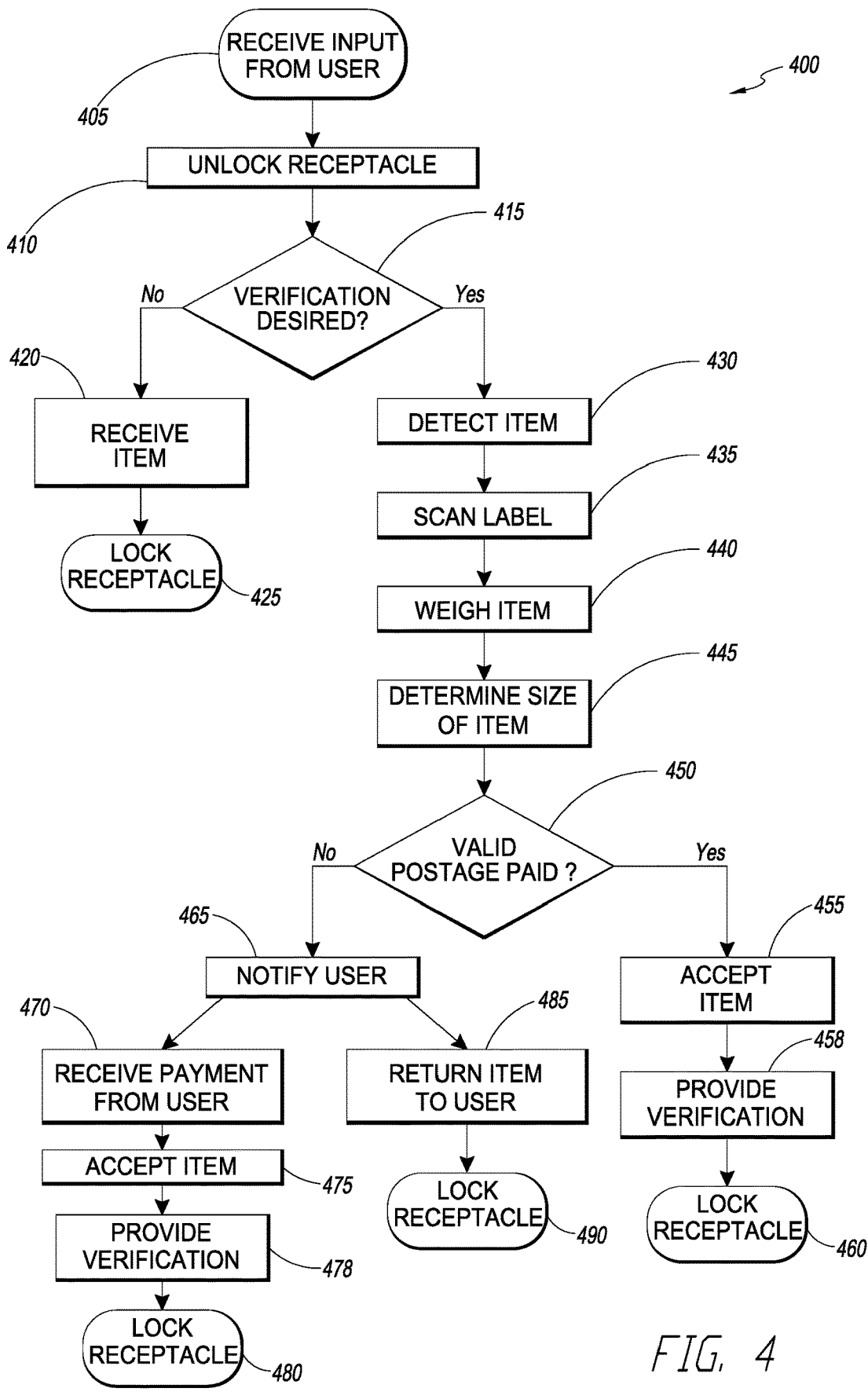
FIG. 4 is a flowchart illustrating an exemplary method of receiving an item at a smart drop box.

FIG. 4 is a flowchart illustrating an exemplary method 400 of receiving an item at a smart drop box 100. The method 400 can be performed by a computer system integrated with a smart drop box 100 in a smart drop box system 300 as depicted in FIGS. 1A-C.

The method 400 begins with block 405, where the smart drop box 100 receives an input from a user indicating that an item is to be deposited. For example, the input can include a tactile input such as the user touching a screen 122 or pressing a key on a keypad 130 of a user interface 120. In some implementations, a user may indicate that an item is to be deposited by scanning a barcode or QR code on a label, printout, or electronic device screen at the external imaging device 124. In some embodiments, the item having the label thereon is scanned. The external imaging device images or scans the label on the item, and transmits the information to the processor 310. The method 400 may also be initiated when the smart drop box 100 detects that a user has operated the handle 114 of the item receptacle 325, or detects the presence of an item within the receptacle 325 based on a signal from the scale 335 or the internal image capture device 330.

When the smart drop box 100 has detected that a user wishes to ship an item in block 405, the method 400 continues to block 410, where the receptacle 325 is unlocked. Unlocking the receptacle 325 can include unlocking a latch or other locking mechanism to allow the user to open the receptacle 325, such as by opening a locker door 142 or rotating a wall drum 112. In some embodiments, the smart drop box may further be configured to automatically open the receptacle 325, such as by rotating the wall drum 112. When the receptacle 325 is unlocked, the method 400 continues to decision state 415. In embodiments where the method 400 begins with a user operating the handle 114 of the item receptacle 325 or the presence of the item being detected, block 410 may be omitted.

The method 400 moves to decision state 415, wherein the processor 310 determines whether verification of deposit, such as a printed receipt or an electronic notification, is desired. The smart drop box 100 can prompt the user to indicate whether verification is desired, such as by displaying a verbal instruction on a screen 122 of the user interface 120 and receiving a "yes" or "no" input at the touch screen 122 or keypad 130.

In some embodiments, where a label is scanned at the external imaging device 340, and the label was provided to the item shipper by the e-commerce platform 365, or if the label is associated with the e-commerce platform 365, the processor 310 can identify that the transaction requests a verification without additional input from the user.

If it is determined in decision state 415 that verification is not desired, the method 400 continues to block 420, where the item is received in the receptacle. Receiving the item may include receiving the item in the receptacle 325 and closing the receptacle 325, either automatically by a motor 338 or manually by the user. After the item is received, the method 400 terminates at block 425, where the receptacle 325 is locked. The receptacle 325 can be locked in a closed position and the smart drop box 100 can be ready to repeat the method 400 beginning at block 405 when a subsequent input is received from a user. If verification is desired, the method continues to block 430.

If it is determined in decision state 415 that verification is desired, the method 400 moves to block 430, wherein the item is detected in the smart drop box 100. For example, when the user places the item within the smart drop box 100, the smart drop box 100 can detect the presence of the item based on an internal image capture device 330 observing an item within the receptacle 325 or a scale 338 measuring a weight, or the smart drop box 100 can detect that an item has been inserted if the user closes or partially closes the receptacle 325. In some embodiments, the method 400 can include locking the receptacle 325 before implementing further verification processes. Locking the receptacle 325 while item information and/or payment information is obtained can enhance security of the deposit verification process. For example, locking the receptacle 325 can prevent a user from obtaining an inaccurate or fraudulent deposit verification by inserting an item for verification, but removing and retaining the item after receiving a deposit verification. Similarly, locking the receptacle 325 can prevent a user from obtaining a deposit verification and then substituting an alternative item to be shipped.

After the item is detected in block 430, the method 400 continues to block 435, wherein a label on the item is scanned by the internal image capture device 330. The label can include a barcode, QR code, or other optically readable information medium, and can include item information such as the identity of the sender, return address, shipping address, identity of the addressee, desired shipping service, and/or the amount of postage paid to ship the item. In some aspects, the label may include contact information for the sender and/or the addressee, such as a telephone number, fax number, street address, post office box address, email address, electronic account information, or other contact information. After the label is scanned, the method 400 continues to block 440. In some embodiments, item information can be input at the user interface 325 and a label may be generated based on the item information. The information associated with the item, such as weight or size, may be confirmed by the scale 335 or internal image capture device 330 when the item is placed in the receptacle 325.

At block 440, the item is weighed, such as by the scale 335 located within the receptacle 325. Weight information determined by the scale 335 can be sent to the processor 310 of the smart drop box 305. After weighing the item, the method 400 continues to block 445, where an item size is determined. The item size can be determined optically by one or more internal image capture devices 330. In some embodiments, the item size can be determined based on analysis of a photographic image taken of the item by the internal image capture device 330. The internal image capture device 330 may also include an optical profile scanner configured to determine one or more dimensions of the item. Item size information can also be sent to the processor 310 of the smart drop box 305. In some embodiments, the item weight and size can be encoded into the label, or can be associated with the label in the database 360 or from the e-commerce platform 365. The processor 310 can obtain the size and weight of an item from the database 360 or the e-commerce platform 365. The size and weight may have been previously provided to the database 360 or to the e-commerce platform 365 when the label for the item was requested.

After the item size is determined in block 445, the method 400 continues to decision state 450, wherein the processor 310 determines whether valid payment is associated with the item. The determination can be made based on factors including item information read from the label, the weight of the item, the size of the item, or any other available information. In some embodiments, the receptacle 325 opens after postage has been paid at the user interface 120, allowing the item to be inserted. In this case, payment can be verified based on confirmation of the item information entered at the user interface 120. In some implementations, the method 400 can verify payment information from the label, such as by communicating with a server 355 and/or database 360 containing payment records.

If the processor 310 determines that valid payment has been made for the item, the method 400 continues to block 455, where the item is accepted. Accepting the item can include closing the receptacle 325 from an intermediate position or allowing the receptacle 325 to be closed completely and transferring the item to a collection container, such as by gravity, a robotic sweeper arm, or the like.

After the item is accepted in block 455, the method 400 continues to block 458, wherein verification of deposit of the item is provided. Various forms of verification can be provided, such as a printed receipt, an electronic receipt delivered by email or other electronic communication, and/or an electronic notification on a computer, smartphone, tablet, or other electronic device. The printer 128 can print a receipt, or the communication device 320 can send an electronic receipt of the deposit to the intended recipient. In some implementations, the user may be able to select one or more forms of verification to be provided. Any of the forms of deposit verification described herein can be transmitted directly or indirectly to the user depositing the item, to the intended recipient of the item, and/or to any third party selected by the user or the intended recipient. For example, a user shipping a sold item to the purchaser of the item may select to have a paper acceptance receipt printed and an email receipt of acceptance verification sent to an email address of the purchaser. Acceptance verification as described herein can include information such as a serial or tracking number, item weight, item size, amount of postage paid, selected shipping service, identity of the user depositing the item, a photograph of the user depositing the item (e.g., obtained by the external image capture device 340 after a message on the screen 122 directs the user to stand in front of the external image capture device 340), or other relevant information.

In some embodiments, the acceptance verification can be provided automatically to the e-commerce platform 365. For example, when a label provided by or associated with the e-commerce platform is scanned and the item is confirmed to have been deposited as described herein, the processor 310 can send an electronic communication to the e-commerce platform 365 via the network 350 confirming receipt of the item having the label thereon. The electronic communication confirms the item was accepted at the receptacle 325 and was inducted into the distribution network.

After verification is provided in block 458, the method 400 terminates at block 460, where the receptacle 325 is locked. The receptacle 325 can be locked in a closed position and the smart drop box 100 can be ready to repeat the method 400 beginning at block 405 when a subsequent input is received from a user.

Referring again to decision state 450, if the processor 310 determines that valid payment has not been made for the item, the method 400 continues to block 465, where the user is notified that the item does not have valid payment information. The user can be notified by a message on the screen 122 of the user interface 120 of the smart drop box 100. In some embodiments, the smart drop box 100 is configured to facilitate the purchase of shipping services. The user notification can include a prompt asking if the user desires to pay postage to ship the item. Responsive input may then be received at the touch screen 122 or keypad 130 of the user interface 120. If the user does not wish to pay, or if the smart drop box 100 is not configured to allow the purchase of shipping services, the method 400 continues to block 485, where the item is returned to the user. Returning the item to the user can include unlocking the receptacle 325 and/or automatically opening the receptacle 325 from an intermediate position to permit the user to retrieve the item. When the item has been retrieved, the method terminates at block 490, where the receptacle 325 is locked. The receptacle 325 can be locked in a closed position and the smart drop box 100 can be ready to repeat the method 400 beginning at block 405 when a subsequent input is received from a user.

If the user wishes to pay based on the notification at block 465, the method continues to block 470, where the smart drop box 100 receives payment from the user. If the item has a readable barcode or QR code, electronically stored item information associated with the barcode or QR code can be updated to reflect the payment, and the updated item information can be transmitted to the server 355. In some embodiments a new label may be applied to the item by the smart drop box 100 or may be printed by a printer 128 for application by the user. In some embodiments, the item may not have a label thereon, and a label can be printed for the user to affix to the item.

After payment is received from the user, the method 400 continues to block 475, where the item is accepted. Accepting the item can include closing the receptacle 325 from an intermediate position or allowing the receptacle 325 to be closed completely and transferring the item to a collection container, such as by gravity, a robotic sweeper arm, or the like.

After the item is accepted, the method continues to block 478. At block 478, verification of deposit of the item is provided. Verification can include any of the forms, recipients, and/or content described above with reference to block 458. After verification is provided, the method terminates at block 480, where the receptacle 325 is locked. The receptacle can be locked in a closed position 325 and the smart drop box 100 can be ready to repeat the method 400 beginning at block 405 when a subsequent input is received from a user.

Figure 5:
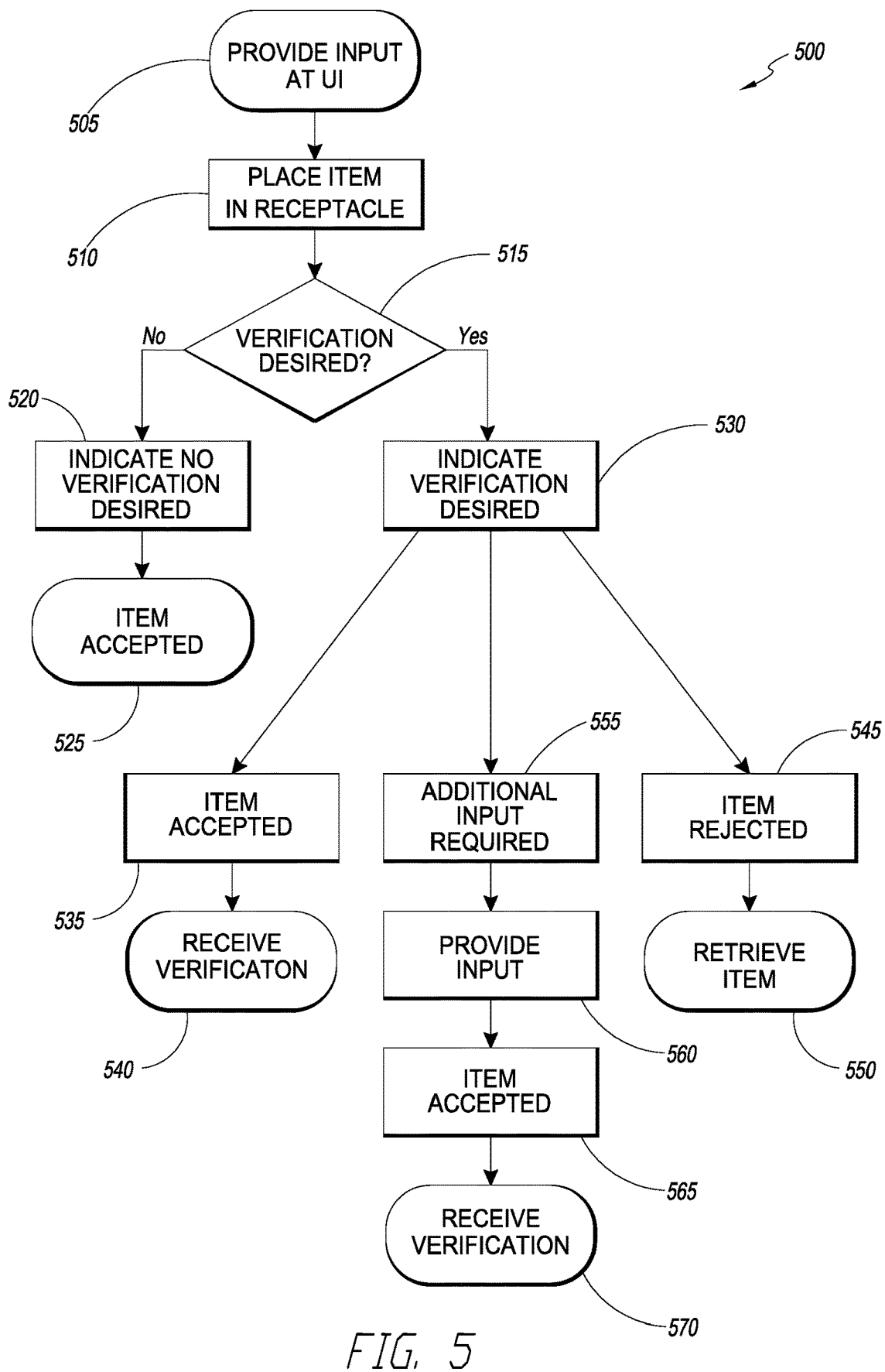
FIG. 5 is a flowchart illustrating an exemplary method of depositing an item at a smart drop box.

FIG. 5 is a flowchart illustrating an exemplary method 500 of depositing an item at a smart drop box 100. The method 500 can be performed by a user interacting with a smart drop box 100 in a smart drop box system 300 as depicted in FIGS. 1A-C.

The method 500 begins with block 505, where the user provides input at the user interface 120 of the smart drop box 100. The user input can include pressing a button on a keypad 130 of the user interface 120, touching a touch screen 122 of the user interface 120, approaching a proximity sensor, opening a parcel receptacle 325 of the smart drop box 100, scanning a label or electronic device screen at an optical scanner, or otherwise indicating that an item is to be deposited. After the user provides input to the smart drop box 100, the method 500 continues to block 510. At block 510, the user places an item into the item receptacle 325, such as by opening a door 142 or wall drum 112 of the receptacle 325 and inserting the item. After the user places the item into the item receptacle 325, the method 500 continues to decision state 515.

At decision state 515, the user decides whether deposit verification is desired. The user may be prompted to decide by a message displayed on the display screen 122 of the user interface 120 of the smart drop box 100. If the user decides not to request deposit verification, the method 500 continues to block 520. At block 520, the user indicates that no verification is desired. For example, the user may press a key on the keypad 130 or select an option (e.g., "no") presented on the touch screen 122 to provide such indication to the smart drop box 100. After the user indicates that no verification is desired, the method 500 terminates at block 525, where the user observes that the item has been received by the smart drop box 100. Receipt of the parcel is described in greater detail above with reference to FIG. 4. If the user at decision state 515 decides to request acceptance verification, the method 500 continues to block 530.

At block 530, the user indicates that verification is desired, such as by pressing a key on the keypad 130 or selecting an option (e.g., "yes") presented on the touch screen 122. If no further input is required, the method 500 may continue to either block 535 or block 545. At block 535, the item is received as described above, and the method 500 terminates at block 540. At block 540, the user or another receives verification of the deposit of the item. The user may receive a printed paper verification receipt directly from the printer 128 of the smart drop box 100, or may receive electronic verification, such as an email, a notification within a mobile application, or other verification sent by the communication device 320. Electronic verification may further be received an addressee if an email address or other contact information was provided or stored in connection with the item information. At block 545, the parcel is rejected, for example, due to insufficient postage or inconsistent item information, or due to user selection preventing the item from being received. If the parcel is rejected, the method 500 terminates at block 550, where the user retrieves the item from the smart drop box 100.

Referring again to block 530, the smart drop box 100 may require additional input, such as payment of additional postage, verification preferences, or other input. If such input is required, the method 500 proceeds to block 555, where the user is notified that additional input is required. The notification may be read from the display screen 122 of the smart drop box 100. The method 500 then continues to block 560, where the user provides the requested input. For example, if an item has insufficient postage for shipping, the input can include paying additional postage using a magnetic card reader 126 or currency acceptor 127 of the smart drop box 100. In some aspects, the user may input one or more email addresses, telephone numbers, or other contact information where the deposit verification is to be sent. Contact information can correspond to the user, the intended recipient, or any third party the user desires to notify of the deposit of the parcel. After the user provides input, the method 500 continues to block 565, where the item is received as described above with reference to block 535. After the item is received, the method 500 terminates at block 570, where the user receives verification as described above with reference to block 540.

Figure 6:
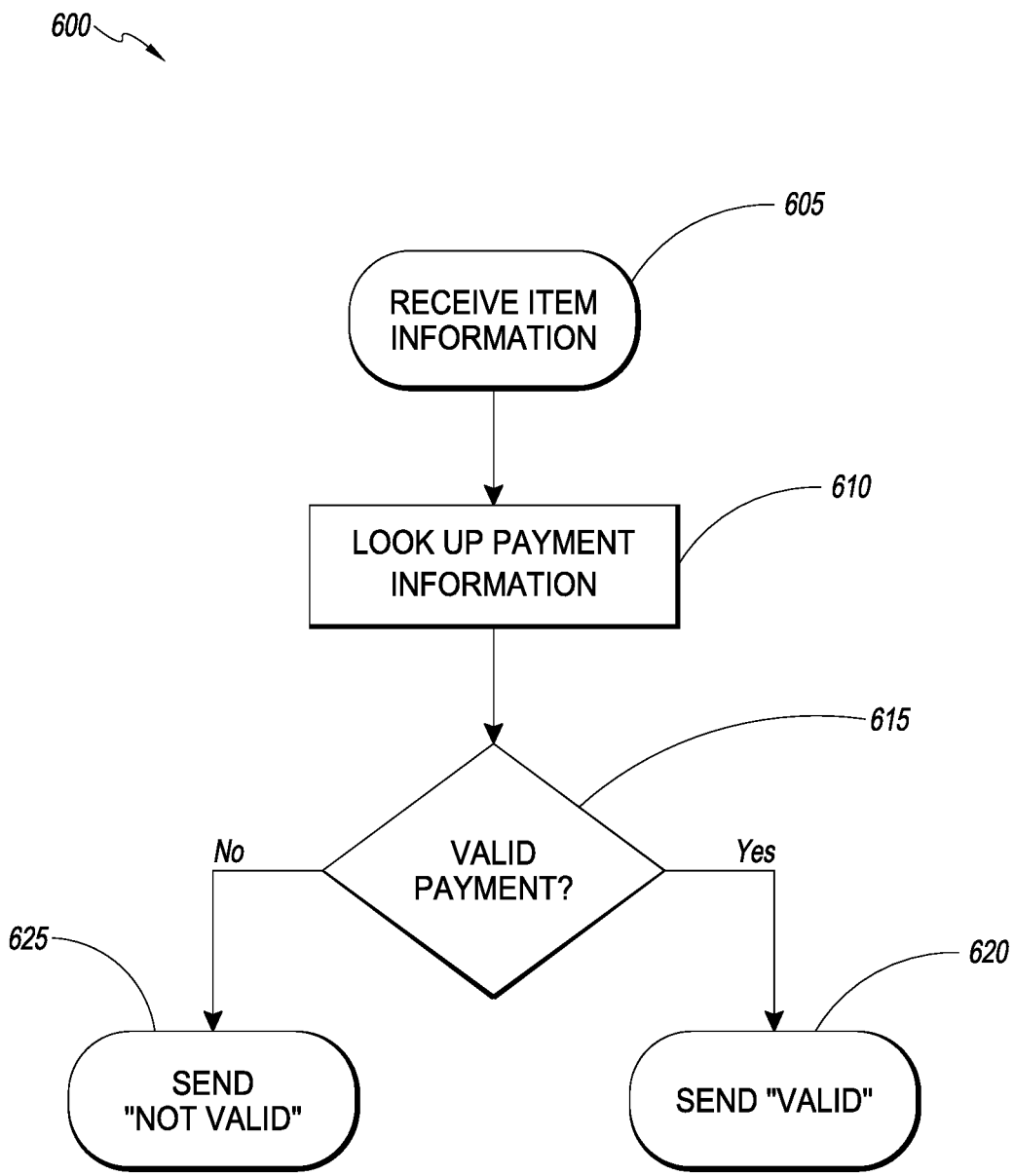
FIG. 6 is a flowchart illustrating an exemplary method of verifying payment associated with an item deposited at a smart drop box.

FIG. 6 is a flowchart illustrating an exemplary method 600 of verifying payment information related to an item deposited at a smart drop box 100. The method 600 can be performed by the server 355 or other computing device in communication with a smart drop box 100 in a smart drop box system 300 as depicted in FIGS. 1A-3.

The method 600 begins with block 605, where item information is received from a smart drop box 100. The item information may be obtained, for example, from the communication device 320 based on information associated with an item that has been placed into the item receptacle 325 of the drop box 100 for shipping. The item information can be received from the communication device 320 through any type of communication network, such as the internet, a local area network (LAN), wireless communication such as Wi-Fi, satellite communication, or any other network capable of transferring data between the smart drop box 100 and the server 355 or other computing device. The item information can include shipping information, such as a destination address, a return address, a name associated with the destination or return address, and/or a shipping service such as a shipping method or speed. The item information can also include a serial or tracking number. In some embodiments, the item information may include a serial or tracking number encoded in a barcode or QR code on a label affixed to the item, and the detected weight of the item within the smart drop box 100. After the item information is received, the method 600 continues to block 610.

At block 610, payment information related to the item is retrieved or looked up based on the received item information. Retrieving payment information can include querying a database 360 containing payment records, label serial numbers or tracking numbers, and/or other relevant information. For example, an exemplary database 360 may contain a list of tracking numbers that have been created and may include, for each tracking number, an amount of payment made, a maximum allowable item weight, a maximum allowable item size, whether an item associated with the tracking number has already been deposited, an origin address, a destination address, a customer email address, a recipient email address, and/or any other relevant information. After payment information is retrieved or looked up, the method 600 continues to decision state 615.

At decision state 615, the processor 310 determines whether valid payment has been made for the item. The determination at decision state 615 can be made based on the item information received from the smart drop box 100 and/or the payment information retrieved from the database 360. In one example, the item information includes a tracking number and a weight of the item. The database 360 contains an entry listing the tracking number, an indication that payment has been made for the tracking number, and a corresponding maximum weight of the item. The server 355 can then compare the maximum weight with the actual weight of the item received from the smart drop box 100. If the weight of the item is less than or equal to the maximum weight, the processor 310 determines that valid payment has been made. If the weight of the item is greater than or equal to the maximum weight, the processor 310 determines that valid payment has not been made.

If it is determined at decision state 615 that valid payment has been made, the method 600 terminates at block 620, where a "valid" signal is sent to the communication device 320 of the smart drop box 100. The "valid" signal can be any communication signal indicating that valid postage has been paid. If decision state 615 results in a determination that valid payment has not been made, the method 600 terminates at block 625, where a "not valid" signal is sent to the communication device 320 of the smart drop box 100. Similarly, the "not valid" signal can be any communication signal indicating that valid payment has not been made. The smart drop box 100 may then receive the parcel, reject the parcel, or require additional input based on the signal, as described above with reference to FIGS. 4 and 5.

Figure 7:
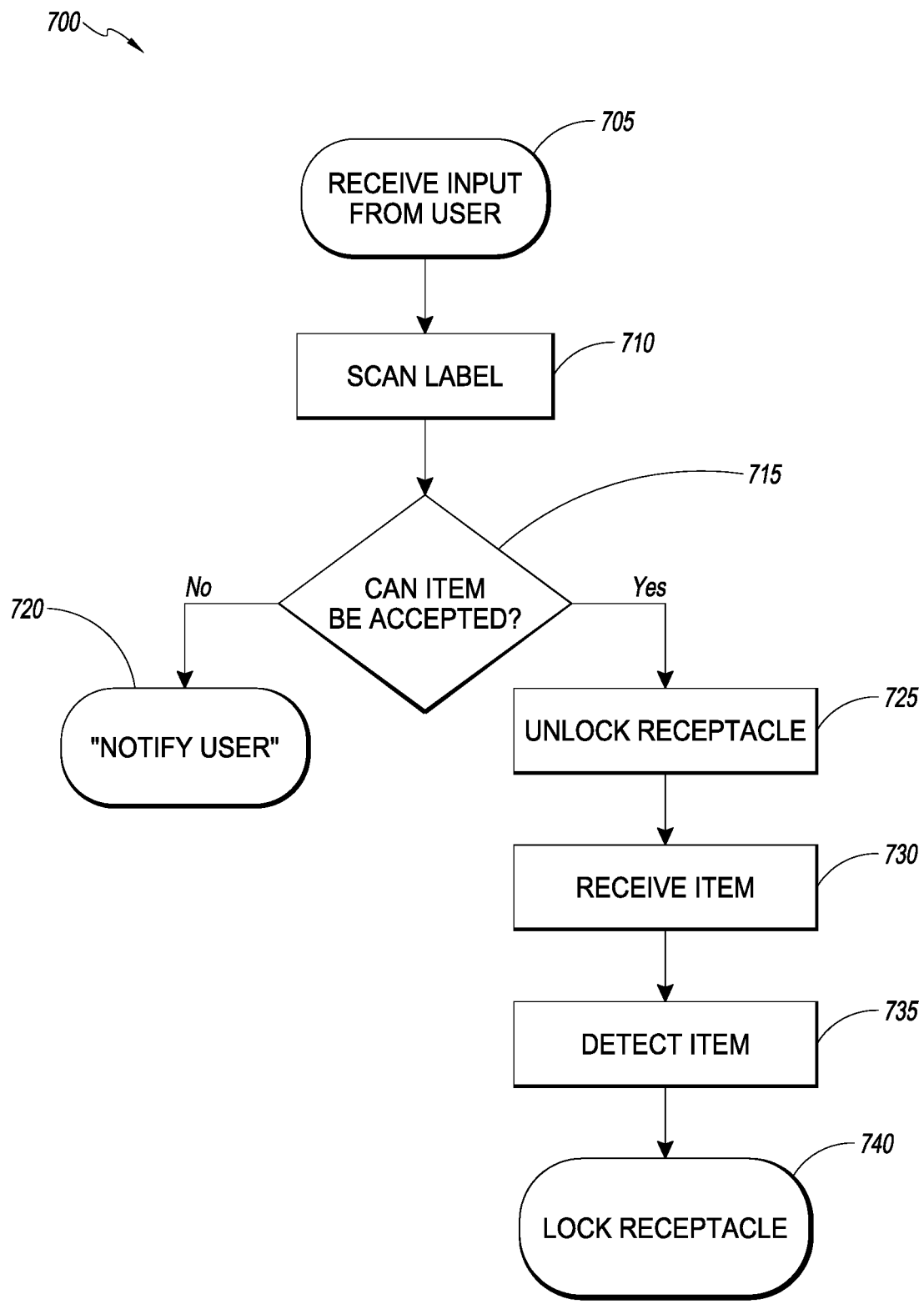
FIG. 7 is a flowchart illustrating an exemplary method of receiving an item at a smart drop box.

FIG. 7 is a flowchart illustrating an exemplary method 700 of receiving an item at the smart drop box 100. The method 700 can be performed by a computer system integrated with a smart drop box 100 in a smart drop box system 300 as depicted in FIGS. 1A-C.

The method begins with block 705, where the smart drop box 100 receives an input from a user indicating that an item is to be deposited. For example, the input can include a tactile input such as the user touching a screen 122 or pressing a key on a keypad 130 of a user interface 120. In some implementations, the method 700 may be initiated when the smart drop box 100 detects the presence of a user or item based on proximity. When the smart drop box 100 has detected that a user wishes to deposit an item, the method 700 continues to block 710. This process can be similar to that described elsewhere herein, and particularly as described with reference to blocks 405, 505, and 605.

At block 710, a label on the item can be scanned by an external image capture device 340. The label can include a barcode, QR code, or other optically readable information medium, and can include item information such as the identity of the sender, return address, shipping address, identity of the addressee, desired shipping service, size of the item, weight of the item, and/or the amount of postage paid to ship the item. In some aspects, the label may include contact information for the sender and/or the addressee, such as a telephone number, fax number, street address, post office box address, email address, electronic account information, or other contact information. After the label is scanned, the method 700 continues to decision state 715.

At decision state 715, the processor 310 determines whether the item can be accepted at the smart drop box 100. For example, the processor 310 can determine whether the item can be accepted based on the information obtained from scanning the label at block 710. The processor 310 may determine that the item cannot be accepted, for example, if the item exceeds one or more maximum dimensions of acceptable items, if the item is heavier than a predetermined weight threshold for acceptable items, if the item is associated with a shipping service that does not permit the induction of items at a drop box (e.g., the item is to be insured), if the item does not have valid postage, or the like.

If it is determined at decision state 715 that the item cannot be accepted at the smart drop box 100, the method 700 terminates at block 720, where the user is notified that the item cannot be accepted. For example, the user may be notified by a visual or audio message. In some embodiments, the notification may include one or more reasons that the item cannot be accepted, and/or may direct the user to take the item to an employee for further assistance.

If it is determined at decision state 715 that the item can be accepted, the method 700 continues to block 725, where the receptacle 325 is unlocked. Unlocking the receptacle 325 can include unlocking a latch or other locking mechanism to allow the user to open the receptacle 325, such as by opening a locker door 142 or rotating a wall drum 112. In some embodiments, the smart drop box may further be configured to automatically open the receptacle 325, such as by rotating the wall drum 112 or sliding a rolling door 162 by one or more motors or other actuators. When the receptacle 325 is unlocked, the method 700 continues to block 730.

At block 730, the item is received within the receptacle. For example, the user may place the item within the receptacle. After the item is received, the method 700 continues to block 735, where the item is detected. The item may be detected, for example, based on weight, proximity, or visual detection, for example, by an image capture device, a light gate, or other item detecting device. After the item is detected, the method 700 terminates at block 740, where the receptacle is locked. In some embodiments, locking the receptacle can include closing the receptacle, such as by rotating the wall drum 112 or sliding the rolling door 162.

In some embodiments, a system may have a user scan the barcode on their package with a scanner that is on the exterior of the item receptacle, and then place the package inside the unit; inside the unit there may be some means of package detection, e.g. a laser/optical sensor and/or scale to verify that something was deposited.

Figure 8:
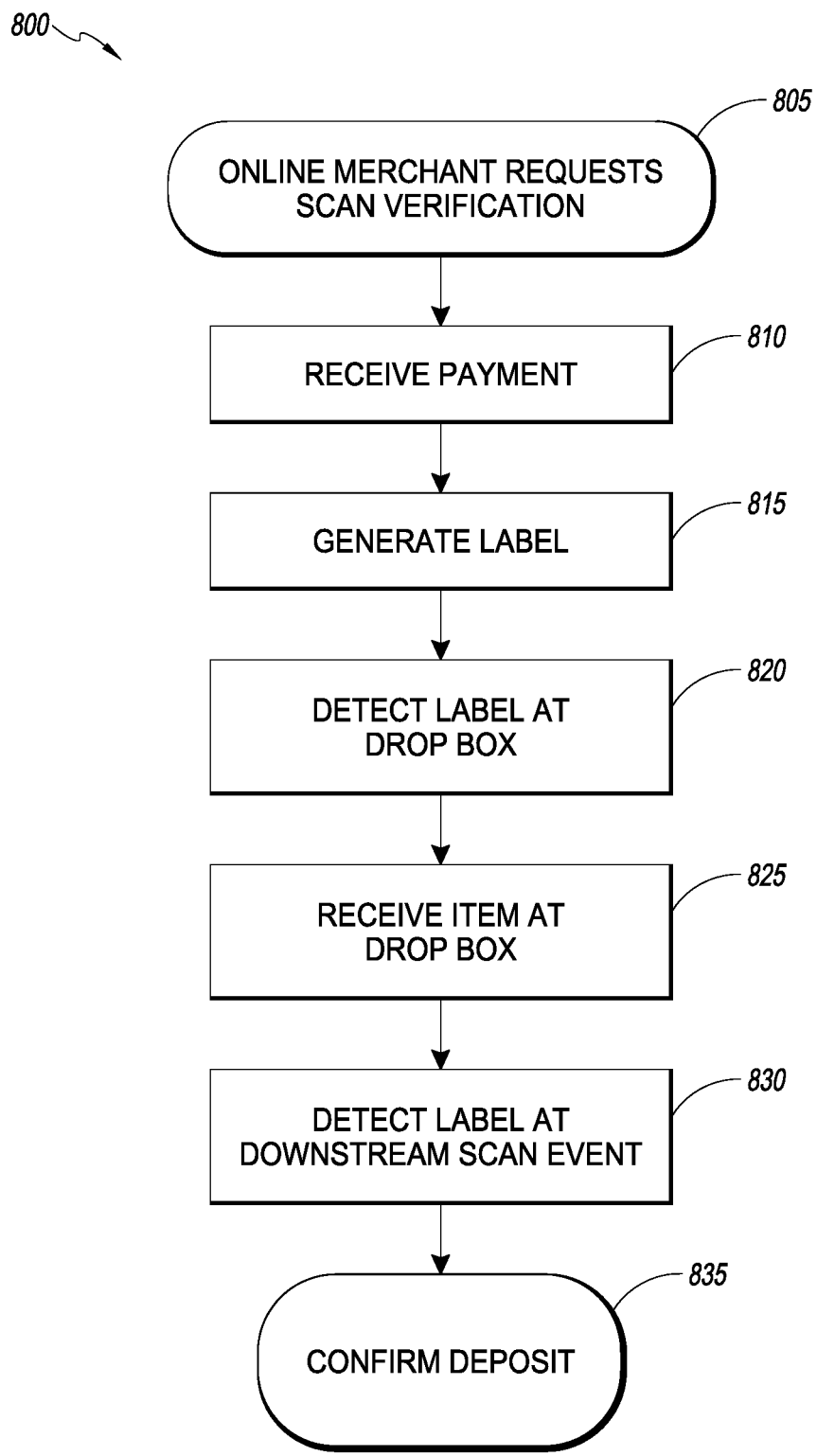
FIG. 8 is a flowchart illustrating an exemplary method of verifying deposit of an item at a smart drop box.

FIG. 8 is a flowchart illustrating an exemplary method 800 of verifying deposit of an item at a smart drop box. The method 800 can be performed by a computer system integrated with a smart drop box 100 in a smart drop box system 300 as depicted in FIGS. 1A-C. In some embodiments, the computer system may further be integrated with another computer system such as an online merchant, an e-commerce platform 365, or a distribution network.

The method 800 begins with block 805, where an e-commerce platform 365 requests scan verification of an item to be processed in a distribution network, for example, mailed, sent, or shipped. For example, the item may be an item sold by a first user, or seller, of the e-commerce platform 365 to a second user, or buyer, of the e-commerce platform 365. In some embodiments, the item may be an item to be returned from a purchaser to the e-commerce platform 365. After the e-commerce platform requests scan verification, the method continues to block 810.

At block 810, the system 300 receives payment associated with the item. For example, the payment may be payment for postage or other shipping services associated with the item to be transferred. Payment may be received electronically by the e-commerce platform 365 or a second entity associated with the e-commerce platform 365 and/or a distribution network. In some embodiments, the payment may be received at the smart drop box 100, such as by scanning a credit card or receiving cash at a user interface 120 of the smart drop box 100. After payment is received, the method 800 continues to block 815, where a label is generated for affixing to the item. The label can include a barcode, QR code, or other optically readable information medium, and can include item information such as the identity of the sender, return address, shipping address, identity of the addressee, desired shipping service, size of the item, weight of the item, and/or the amount of postage paid to ship the item. In some aspects, the label may include contact information for the sender and/or the addressee, such as a telephone number, fax number, street address, post office box address, email address, electronic account information, or other contact information. After the label is generated, the method continues to block 820.

At block 820, the label is detected at the smart drop box 100. The detected label may be affixed to the item, for example, before or after the detection of the label. The label can be detected by scanning at an image capture device, such as the external image capture device 340 or the internal image capture device 330 of the smart drop box system 300. In some embodiments, information contained in the label may be recorded in memory associated with the computer system, such as a database of deposited items. The information recorded from the label may include identifying information associated with the item, for example, a unique identifier such as a tracking number or other alphanumeric identifier corresponding to the item.

After the label is detected, the method 800 continues to block 825, where the item is received at the smart drop box 100. The item can be received by a method such as the methods 400 and 700 described with reference to FIGS. 4 and 7. In some embodiments, receipt of the item may be detected without scanning a label on the item at the time of receipt. For example, with reference to the shutter door item receptacle 260 depicted in FIG. 2C and the system 300 depicted in FIG. 3, the item 250 may be placed into the receptacle 260 while the front section 262 of the shutter door 263 is open and the rear section 264 is closed. The front section 262 is closed and the rear section 264 is opened, allowing the item 250 to roll out of the receptacle 260 and into the bin 270. As the item 250 rolls out of the receptacle 260, it passes by the internal sensor 269, which detects the passage of an item. The internal sensor 269 may send a signal indicative of a detection event to the processor 310, indicating that an item was detected. In response to receiving the signal from the internal sensor 269, the processor 310 sends a signal to the server 355 through the network 350 and the communication device 320 indicating that a detection event occurred associated with the label detected at block 820. In response, the server may update an entry in the database 360 associated with the label (e.g., an entry created when the item was ordered or the label was created). After the item is received, the method 800 continues to block 830. In some embodiments, the internal sensor 269 can send to the processor 310 a signal indicative of a tracking number and/or postage determined from an RFID tag, or from an image of the item taken in the item receptacle 260.

At block 830, the label is detected at a downstream scan event. The downstream scan event may occur at any point in the item transfer process downstream from the receiving of the item at the smart drop box system 300. For example, labels affixed to items received at the smart drop box system 300 may be scanned individually when transferred from the smart drop box system 300, such as to a transport vehicle, an item sorting system, or the like. In another example, the labels of items received at the smart drop box system 300 may be scanned later, such as after transport from the smart drop box system 300, upon arrival at a processing facility, and/or during a sorting process at the processing facility. With continued reference to example system 300 depicted in FIG. 3, a signal indicative of the downstream scan event may be sent through the network 350 to the server 355. Responsive to being notified of the downstream scan event associated with the scanned label, the server 355 can cause the entry in the database 360 corresponding to the scanned label to be updated to reflect that the label was detected at a downstream scan event. For example, the server 355 may add information to the database entry an indication that the item's presence was detected.

At block 835, the deposit of the item is confirmed. In some embodiments, confirming deposit of the item may include detecting, from the downstream scan event, item information contained within the label. The item information may include a unique identifier, such as a tracking number or alphanumeric identifier corresponding to the item. The identifier detected at the downstream scan event can be compared to an item record stored in the database. For example, the processor 310 can compare the downstream scan event for a particular label, based on the unique identifier, and query the database 360 to determine whether there is an associated induction or acceptance scan created at the smart drop box 100. If the label information was received, or if the label was scanned at the smart drop box 100 during the deposit of the item, and if the database contains an indication that the internal sensor 269 detected the item's presence on receipt of the item, the processor 310 can confirm that the item was deposited. In some embodiments, verification of the deposit may then be sent to the e-commerce platform 365 and/or to a user of the e-commerce platform 365.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A smart drop box comprising:
   an item receptacle comprising a door, the door operable in an open state, an intermediate state, and a closed state;
   a collection container disposed proximate the item receptacle and configured to receive an item from the item receptacle;
   a locking mechanism connected to the item receptacle for locking the door of the item receptacle;
   wherein in the open state the door is unlocked and the item receptacle is configured to receive an item from a user, wherein when the door is in the intermediate state, the locking mechanism locks the door such that the door prevents the user from inserting or removing items from the item receptacle and the item is retained within the item receptacle, and wherein when the door is in the closed state, the item receptacle is configured to allow the item to pass to the collection container;
   a scanning device configured to scan an item located within the item receptacle while the door is locked in the intermediate state, and to generate item information based on the scan;
   a processor in communication with the scanning device, the locking mechanism, and the item receptacle, the processor configured to receive the item information, confirm receipt of a deposit from a user interface in communication with the processor, and make a determination as to whether the item should be accepted;
   wherein if the item is accepted the door moves to the closed state and the processor is configured to generate a confirmation of the deposit, and wherein if the item is rejected, the door moves to the open state and the item receptacle is configured so the user may retrieve the rejected item.

2. The smart drop box of claim 1, wherein the door comprises a shutter door and wherein the locking mechanism is configured to lock the shutter door in the intermediate position in the locked state following receipt of the item.

3. The smart drop box of claim 1, wherein the scanning device is further configured to capture an image of a user, wherein the deposit verification is based at least in part on the image of the user.

4. The smart drop box of claim 1, further comprising an internal sensor disposed within the receptacle, the internal sensor in communication with the processor and configured to scan the item within the receptacle, wherein the processor is configured to determine, based at least in part on the scan of the item within the receptacle, whether the item within the receptacle is the item scanned at the scanning device.

5. The smart drop box of claim 1, wherein determining item information comprises optically reading encoded information from a label affixed to the item.

6. The smart drop box of claim 5, wherein the processor is further configured to determine payment information based on the scanned item information.

7. The smart drop box of claim 1, wherein the item receptacle comprises a scale, and wherein determining item information comprises measuring a weight of the item.

8. The smart drop box of claim 1, further comprising a printer, wherein generating the confirmation of the deposit comprises causing a receipt to be printed.

9. The smart drop box of claim 1, wherein generating the confirmation of the deposit comprises sending an electronic receipt to an email address associated with the user.

10. The smart drop box of claim 1, wherein generating the confirmation of the deposit comprises sending an electronic receipt to an email address associated with a person other than the user.

11. A method of providing item deposit verification, the method comprising:
   receiving an item from a user at an item receptacle of an automated drop box with a door of the item receptacle in an open, unlocked state;
   securing the item within the item receptacle of the automated drop box by locking the door in an intermediate state, thereby preventing the user from inserting into or removing items from the item receptacle;
   determining item information related to the item based on scanning the item while the item is secured within the item receptacle;
   wherein if the item is rejected based upon the item information, moving the door to the open, unlocked state for rejected item retrieval by the user; and
   wherein if the item is accepted based upon the item information:
      transferring the item to a collection container with the item receptacle by moving the door to the closed state; and
      generating a deposit confirmation based at least in part on at least one of the item information and the payment information.

12. The method of claim 11, further comprising capturing an image of the user, wherein the deposit confirmation comprises the image of the user.

13. The method of claim 12, wherein providing the deposit confirmation comprises transmitting the image of the user to a person other than the user.

14. The method of claim 11, wherein determining item information comprises optically reading encoded information from a label affixed to the item.

15. The method of claim 11, wherein determining item information comprises measuring a weight of the item.

16. The method of claim 11, wherein providing the deposit confirmation comprises printing a receipt.

17. The method of claim 11, wherein providing the deposit confirmation comprises sending an electronic receipt to an email address associated with the user.

18. The method of claim 11, wherein providing the deposit confirmation comprises sending an electronic receipt to an email address associated with a person other than the user.

19. The method of claim 11, further comprising determining payment information based at least in part on the item information.

20. The method of claim 19, wherein determining payment information comprises obtaining, from a server, a record of payment associated with the encoded information.

* * * * *